(12) United States Patent
Kurio et al.

(10) Patent No.: US 7,054,175 B2
(45) Date of Patent: May 30, 2006

(54) DC-DC CONVERTER

(75) Inventors: Nobuhiro Kurio, Kyoto (JP); Takaya Hasebe, Kyoto (JP)

(73) Assignee: Nissin Electric Co., Ltd., Kyoto (JP)

( * ) Notice: Subject to any disclaimer, the term of this patent is extended or adjusted under 35 U.S.C. 154(b) by 55 days.

(21) Appl. No.: 10/938,823

(22) Filed: Sep. 13, 2004

(65) Prior Publication Data

US 2005/0047183 A1    Mar. 3, 2005

Related U.S. Application Data

(63) Continuation-in-part of application No. 10/642,681, filed on Aug. 19, 2003, now abandoned.

(30) Foreign Application Priority Data

Aug. 22, 2002 (JP) .............................. 2002-242267

(51) Int. Cl.
*H02M 3/158* (2006.01)
(52) U.S. Cl. ....................................................... 363/65
(58) Field of Classification Search .................. 363/65, 363/67, 68, 71

See application file for complete search history.

(56) References Cited

U.S. PATENT DOCUMENTS

| | | | |
|---|---|---|---|
| 4,695,933 A * | 9/1987 | Nguyen et al. ................ 363/17 |
| 6,275,396 B1 * | 8/2001 | Farrar .......................... 363/65 |
| 6,381,155 B1 * | 4/2002 | Kadatsky et al. ............. 363/65 |
| 6,574,125 B1 | 6/2003 | Matsukawa et al. |

FOREIGN PATENT DOCUMENTS

JP    2002-223565    8/2002

* cited by examiner

*Primary Examiner*—Adolf Berhane
(74) *Attorney, Agent, or Firm*—Finnegan, Henderson, Farabow, Garrett & Dunner, L.L.P.

(57) ABSTRACT

A circuit configuration in which a pair of conversion circuit parts for converting a power source voltage of a DC power source into an AC by two pairs of switching elements made of a full bridge configuration and a pair of transformers is used as inverter units. The n groups of the inverter units are provided with respect to the DC power source, and a secondary side of one transformer of each of the inverter units are connected in series among the n groups and also a secondary side of the other transformer are connected in series among the n groups.

9 Claims, 19 Drawing Sheets

FIG. 4

| | ONE PERIOD [T] | | | | | | | |
|---|---|---|---|---|---|---|---|---|
| | 1/4 PERIOD T₁ [1/4·T] | | 1/4 PERIOD T₂ [1/4·T] | | 1/4 PERIOD T₃ [1/4·T] | | 1/4 PERIOD T₄ [1/4·T] | |
| | t1 | t2 | t3 | t4 | t5 | t6 | t7 | t8 |
| Q11, Q14 (Q21, Q24) | 0→1 | 1 | 1→0 | 0→0 | 0→0 | 0→0 | 0→0 | 0→0 |
| Q12, Q13 (Q22, Q23) | 0→0 | 0→0 | 0→0 | 0→0 | 0→1 | 1 | 1→0 | 0→0 |
| Q15, Q18 (Q25, Q28) | 0→0 | 0→0 | 0→1 | 1 | 1→0 | 0→0 | 0→0 | 0→0 |
| Q16, Q17 (Q26, Q27) | 1→0 | 0→0 | 0→0 | 0→0 | 0→0 | 0→0 | 0→1 | 1 |

NOTE:
0→1 INDICATES THAT CURRENT CHANGES FROM 0 TO 1 p.u.
1→1 INDICATES THAT IT IS MAINTAINED AT CURRENT OF 1 p.u.
1→0 INDICATES THAT CURRENT CHANGES FROM 1 p.u. TO 0

DC-DC CONVERTER

CROSS REFERENCE TO RELATED APPLICATIONS

This application is a Continuation-In-Part of U.S. application Ser. No. 10/642,681, filed Aug. 19, 2003 now abandoned, which claimed the priority of Japanese Patent Application No. 2002-242267, filed on Aug. 22, 2002, the contents of which are incorporated herein by reference.

BACKGROUND OF THE INVENTION

1. Field of the Invention

The present invention relates to a DC—DC converter, and particularly to a DC—DC converter which is used in a DC power source circuit and converts a power source voltage of a DC power source into a different DC voltage.

2. Description of the Related Art

For example, one example of a DC—DC converter used in a DC power source circuit is shown in FIG. 18.

The DC—DC converter shown in FIG. 18 comprises a pair of conversion circuit parts 1, 2, two transformers $Tr_1$, $Tr_2$, a pair of rectification circuit parts 3, 4, and an LC smoothing circuit part 5. The pair of conversion circuit parts 1, 2 have two pairs of switching elements $Q_1$, $Q_4$, $Q_2$, $Q_3$ and $Q_5$, $Q_8$, $Q_6$, $Q_7$ which are connected by a full bridge configuration. The two transformers $Tr_1$, $Tr_2$ are connected to the output sides of the conversion circuit parts 1, 2. The pair of rectification circuit parts 3, 4 are connected to secondary side outputs of the transformers $Tr_1$, $Tr_2$ and are made of two pairs of diodes $D_1$, $D_4$, $D_2$, $D_3$ and $D_5$, $D_8$, $D_6$, $D_7$. The LC smoothing circuit part 5 is connected in common with the output sides of the rectification circuit parts 3, 4. In this DC—DC converter, a pair of the conversion circuit parts 1, 2 are connected in parallel with a DC power source E. Also, series capacitors $C_1$, $C_2$ are inserted and connected between the output sides of each of the conversion circuit parts 1, 2 and the primary sides of the transformers $Tr_1$, $Tr_2$.

In this DC—DC converter, the switching elements $Q_1$, $Q_4$, $Q_2$, $Q_3$ and $Q_5$, $Q_8$, $Q_6$, $Q_7$ of the conversion circuit parts 1, 2 are alternately turned on or off to obtain an AC waveform output. This AC waveform output of the conversion circuit parts 1, 2 is transformed by the transformers $Tr_1$, $Tr_2$ and the secondary side outputs of the transformers $Tr_1$, $Tr_2$ are rectified by the rectification circuit parts 3, 4 and also are smoothed by the LC smoothing circuit part 5. Therefore, a desired DC voltage $V_{OUT}$ is generated (for example, see JP-A-2002-223565).

By the way, as means for increasing a conversion capacity of the DC—DC converter described above, means using a semiconductor device with large voltage and current or a large-size transformer in components forming the DC—DC converter can be implemented.

However, general versatility of the DC—DC converter decreases as a conversion capacity of a DC—DC converter single device providing the configuration shown in FIG. 18 is increased. That is, in the case of a DC—DC converter with a small single device capacity, it can cope with various capacities requiring a capacity larger than its small capacity and has flexibility, but in the case that a single device capacity is large, it becomes difficult to cope with applications requiring a capacity smaller than its large capacity.

Also, in the case of using a semiconductor device with large voltage and current in components forming the DC—DC converter, it was very difficult to obtain a semiconductor device with high speed and high performance, or in the case of using a large-size transformer, it was difficult to obtain things with good core characteristics.

Thus, the means for increasing a single device capacity of the DC—DC converter is undesirable because there are the problems described above. Therefore, as another means for increasing a conversion capacity of the DC—DC converter, it is considered that plural unitary units are connected in parallel with a DC power source E using a circuit configuration of the DC—DC converter shown in FIG. 18 as a unitary unit.

For example, a DC—DC converter having two unitary units $A_1$, $A_2$ which are connected in parallel with a DC power source E is shown in FIG. 19.

The unitary unit $A_1$ of the DC—DC converter shown in FIG. 19 provides a following configuration. That is, a pair of conversion circuit parts 11, 12 for converting a power source voltage of the DC power source E into an AC by switching elements $Q_{11}$ to $Q_{14}$ and $Q_{15}$ to $Q_{18}$ of a full bridge configuration are connected in parallel with the DC power source E. Rectification circuit parts 13, 14 made of diodes $D_{11}$ to $D_{14}$ and $D_{15}$ to $D_{18}$ are provided to the output sides of each of the conversion circuit parts 11, 12 through transformers $Tr_{11}$, $Tr_{12}$. Series capacitors $C_{11}$, $C_{12}$ are inserted and connected between each of the conversion circuit parts 11, 12 and the transformers $Tr_{11}$, $Tr_{12}$.

Also, the unitary unit $A_2$ has the same circuit configuration as that of the unitary unit $A_1$. That is, it comprises conversion circuit parts 21, 22 of parallel connection made of switching elements $Q_{21}$ to $Q_{24}$ and $Q_{25}$ to $Q_{28}$ of a full bridge configuration, and rectification circuit parts 23, 24 made of diodes $D_{21}$ to $D_{24}$ and $D_{25}$ to $D_{28}$ connected to the output sides of each of the conversion circuit parts 21, 22 through series capacitors $C_{21}$, $C_{22}$ and transformers $Tr_{21}$, $Tr_{22}$. Incidentally, an LC smoothing circuit part 15 is provided to the output sides of the rectification circuit parts 13, 14, 23, 24.

When the plural unitary units $A_1$, $A_2$ are connected in parallel with the DC power source E thus, without respectively increasing conversion capacities of the unitary units $A_1$, $A_2$ and using a semiconductor device with large voltage and current or a large-size transformer as components, a conversion capacity of the whole DC—DC converter can be increased.

However, in the DC—DC converter shown in FIG. 19, when the conversion circuit parts 11, 12, 21, 22 which are voltage sources are connected in parallel, across current flows between the conversion circuit parts by a slight difference in output voltages of the respective conversion circuit parts 11, 12, 21, 22. An output current of the DC—DC converter increases or decreases by this cross current and an unbalance state occurs and thereby overcurrent occurrence is caused. In order to equalize the output voltages of each of the conversion circuit parts 11, 12, 21, 22, a method for performing a feedback control of the output voltages of the conversion circuit parts 11, 12, 21, 22 or a method for suppressing a difference in output voltages by improving accuracy between components in each of the conversion circuit parts 11, 12, 21, 22 is considered. However, bad effects that a control circuit becomes complicated in the former method and an increase in component costs is caused in the latter method occur respectively.

In the above-mentioned DC—DC converter as shown in FIG. 19, the DC—DC converter has a pair of conversion circuit parts, rectification circuit parts, transformers and series capacitors as a unitary unit, but it is not limited to this. An inverter unit IU can be considered as a unitary unit. That is, as shown in FIGS. 18 and 20, the inverter unit IU has an inverter board 60 and a pairs of transformers $Tr_1$, $Tr_2$. The inverter board 60 mounts a pair of conversion circuit parts 1, 2 thereon (In FIG. 20, eight switching elements $Q_1$ to $Q_4$ and $Q_5$ to $Q_8$ are shown). Primary sides of the pairs of transformers $Tr_1$, $Tr_2$ are respectively connected to outputs of each of the conversion circuit parts 1, 2 of the inverter board 60 via lead wires 70, 80, and secondary sides thereof are respectively connected to inputs of rectification circuit parts 3, 4 via lead wires 90, 100.

In this DC—DC converter, in order to increase a conversion capacity of the DC—DC converter, it is considered that plural inverter units IU, each having the inverter board 60 mounting the pair of conversion circuit parts 1, 2 and the pair of transformers $Tr_1$, $Tr_2$, are connected in parallel with a DC power source E while the plural pairs of transformers $Tr_1$, $Tr_2$ of the inverter units IU are connected a pair of the rectification circuit parts 3, 4.

However, if the plural inverter units IU are provided, the number of the transformers $Tr_1$, $Tr_2$ included in the inverter units IU are increased, and thus wiring work for connecting the secondary side of the plural transformers $Tr_1$, $Tr_2$ to the pair of the rectification circuit parts 3, 4 can be complicated. Further, since the inverter boards 60 and the transformers $Tr_1$, $Tr_2$ included in the inverter units IU are heat generation sources, a placement relation between inverter boards 60 and the transformers $Tr_1$, $Tr_2$ has to be considered in view of heat dissipation characteristics.

SUMMARY OF THE INVENTION

Therefore, the invention is proposed in view of the problems, and an object of the invention is to provide a DC—DC converter which can prevent an output current of a DC—DC converter from becoming an unbalance state even when there is a slight difference in output voltage of each conversion circuit part in the case of increasing a conversion capacity of the DC—DC converter.

Another object of the invention is to provide a DC—DC converter which can simplify the wiring work and obtain a good heat dissipation characteristics in the case of increasing a conversion capacity of the DC—DC converter. As technical means for achieving the object, according to the present invention, there is provided a DC—DC converter comprising:

n groups of inverter units provided with respect to a DC power source, the inverter unit having a pair of conversion circuit parts for converting a power source voltage of the DC power source into an AC by switching elements of a full bridge configuration and a pair of transformers whose primary sides are respectively connected to outputs of each of the conversion circuit parts and whose secondary sides are respectively connected to inputs of a pair of rectification circuit parts, wherein the secondary sides of one transformers in the respective inverter units are connected in series among n groups via a wire and also the secondary sides of the other transformers in the respective inverter units are connected in series among n groups via a wire.

In a DC—DC converter according to the invention, by providing n groups of inverter units comprising a pair of conversion circuit parts and a pair of transformers with respect to a DC power source, a conversion capacity of the DC—DC converter can be increased. In the case of increasing the conversion capacity of this DC—DC converter, by connecting the secondary sides of the one transformers in the n groups of the inverter units in series among the n groups and also connecting the secondary sides of the other transformers in series among the n groups, even when there is a slight difference in output voltages of each conversion circuit part, output shares of the secondary sides of one transformers and the secondary sides of the other transformers can be equalized, so that an output current of the DC—DC converter does not become an unbalance state.

Incidentally, the DC—DC converter may have a configuration in which a pair of the conversion circuit parts in each of n groups of the inverter units are connected in parallel with the DC power source. A configuration in which a pair of the conversion circuit parts in each of n groups of the inverter unties are connected in series with the DC power source can also be used. Thus, in n groups of the inverter units having a pair of the conversion circuit parts connected in series with the DC power source, a configuration connected in either parallel or series with the DC power source can be used.

Further, the DC—DC converter can have a configuration in which the one transformers and the other transformers in the n groups of the inverter units are placed in alternate arrangement so that an arrangement end point is fed back to an arrangement start point. With this structure, the wiring work can be simplified when the secondary sides of one transformers in the respective inverter units are connected in series among n groups via a wire and also the secondary sides of the other transformers in the respective inverter units are connected in series among n groups via a wire.

That is, by placing one transformers and the other transformers in alternate arrangement so that the arrangement end point is fed back to the arrangement start point, if the secondary sides of the transformers are connected in series among n groups via the wires, leading of the lead wire in the transformers located at the arrangement start point can be brought close to leading of the lead wire out of the transformers located at the arrangement end point and thus the wiring work such as routing of the lead wires can be simplified.

Here, the "one transformers and the other transformers in alternate arrangement are placed so that the arrangement end point is fed back to the arrangement start point" means that leading of the lead wire in the transformers located at the arrangement start point is made to be brought close to leading of the lead wire out of the transformers located at the arrangement end point in a state that one transformers and the other transformers are placed in alternate manner. Further, the "a pair of the conversion circuit parts" means a structure that two conversion circuit parts are connected in parallel with or in series with the DC power source. The "n groups of inverter units" means a structure that two or more inverter unites are connected in parallel with or in series with the DC power source.

Further, in the DC—DC converter, the inverter boards can be aligned and placed in a state that the inverter boards stand up along an arrangement direction of the transformers and are opposed to the primary sides of the transformers paired. The transformers and the inverter boards can be disposed at multiple stages in a direction perpendicular to the arrangement direction.

Although both of the inverter boards and transformers are heat generation sources, by aligning and placing the inverter boards in a state that the inverter boards stand up along an arrangement direction of the transformers, heat generation from anyone of the inverter boards and the transformers is not blocked by the other of the inverter boards and the transformers and good heat dissipation characteristics can be ensured. Since the inverter boards are placed in an attitude stood up along an arrangement direction of the transformers, effective use of installation space can be made by portrait specifications of the inverter boards.

BRIEF DESCRIPTION OF THE DRAWINGS

FIG. 4 is a table showing on-off states of each the switching element in one period of primary side voltage waveforms of the transformers of FIG. 3;

DETAILED DESCRIPTION OF THE INVENTION

Figure 1:
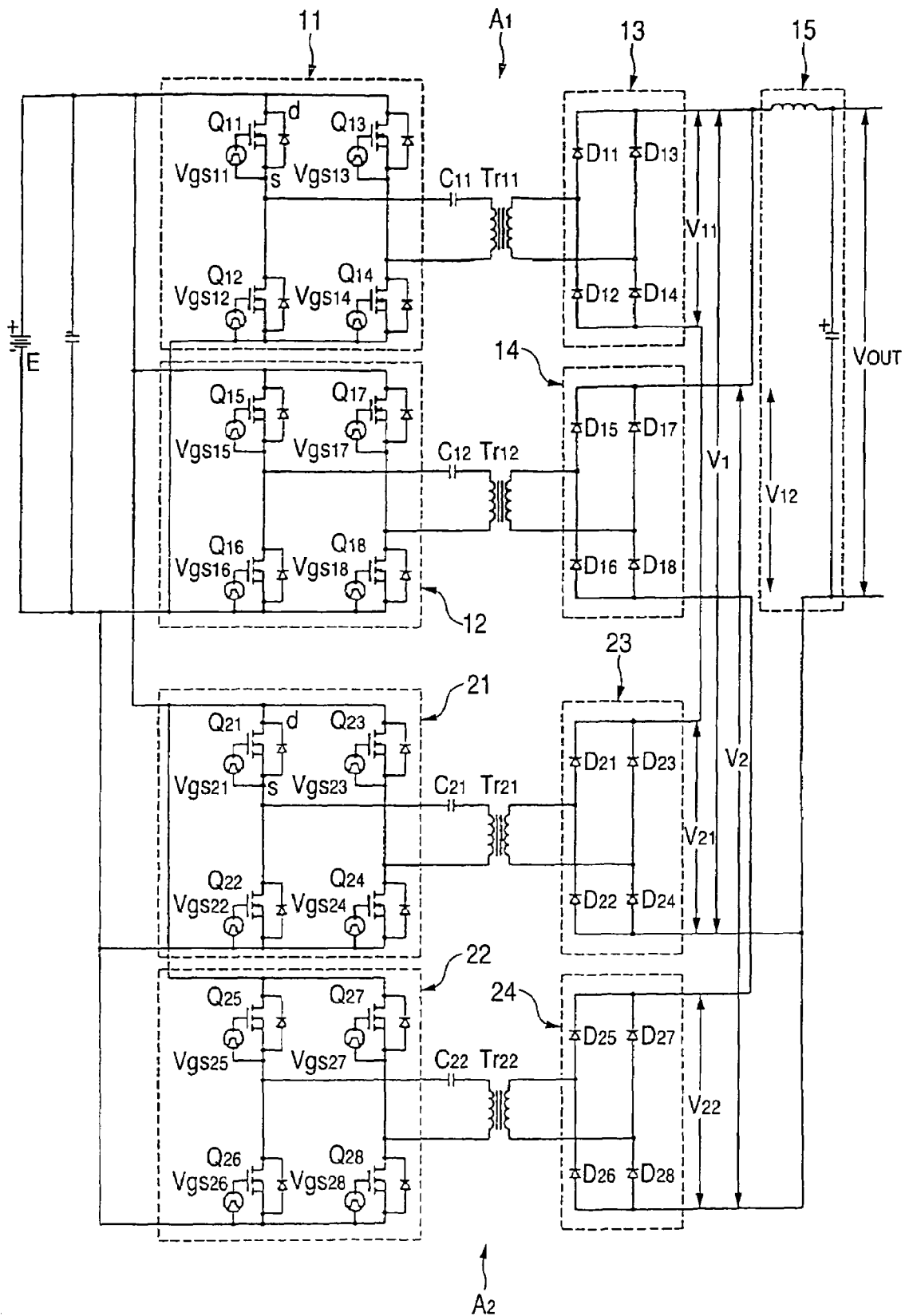
FIG. 1 is a circuit diagram of a DC—DC converter in which two groups of unitary units having a pair of conversion circuit parts connected in parallel are connected in parallel in an embodiment of the invention.

FIG. 1 is a circuit diagram of a DC—DC converter in an embodiment of the invention.

The DC—DC converter of this embodiment provides a circuit configuration in which n groups, for example, two groups of unitary units $A_1$, $A_2$ are connected in parallel with a DC power source E. Incidentally, three or more groups of unitary units can be provided.

One unitary unit $A_1$ provides a following configuration. That is, a pair of conversion circuit parts 11, 12 converts a power source voltage of the DC power source E into an AC by two pairs of switching elements $Q_{11}$, $Q_{14}$, $Q_{12}$, $Q_{13}$ and $Q_{15}$, $Q_{18}$, $Q_{16}$, $Q_{17}$ (for example, MOS-FET, bipolar transistor or IGBT) of a full bridge configuration. The pair of conversion circuit parts 11, 12 are connected in parallel with the DC power source E. Rectification circuit parts 13, 14 made of two pairs of diodes $D_{11}$, $D_{14}$, $D_{12}$, $D_{13}$ and $D_{15}$, $D_{18}$, $D_{16}$, $D_{17}$ are provided to the output sides of each of the conversion circuit parts 11, 12 through transformers $Tr_{11}$, $Tr_{12}$. Series capacitors $C_{11}$, $C_{12}$ are inserted and connected between each of the conversion circuit parts 11, 12 and the transformers $Tr_{11}$, $Tr_{12}$.

Also, the other unitary unit $A_2$ has the same circuit configuration as that of the unitary unit $A_1$. That is, it comprises two conversion circuit parts 21, 22, two transformers $Tr_{21}$, $Tr_{22}$, series capacitors $C_{21}$, $C_{22}$ and rectification circuit parts 23, 24. The two conversion circuit parts 21, 22 have two pairs of switching elements $Q_{21}$, $Q_{24}$, $Q_{22}$, $Q_{23}$ and $Q_{25}$, $Q_{28}$, $Q_{26}$, $Q_{27}$ (for example, MOS-FET, bipolar transistor or IGBT) which are connected by a full bridge configuration and are connected in parallel with the DC power source E. The two transformers $Tr_{21}$, $Tr_{22}$ are connected to each of the output sides of their conversion circuit parts 21, 22. The series capacitors $C_{21}$, $C_{22}$ are inserted and connected between the output sides of each of the conversion circuit parts 21, 22 and the primary sides of the transformers $Tr_{21}$, $Tr_{22}$. The rectification circuit parts 23, 24 are connected to secondary side outputs of the transformers $Tr_{21}$, $Tr_{22}$ and made of two pairs of diodes $D_{21}$, $D_{24}$, $D_{22}$, $D_{23}$ and $D_{25}$, $D_{28}$, $D_{26}$, $D_{27}$.

When the plural unitary units $A_1$, $A_2$ are connected in parallel with the DC power source E thus, without respectively increasing conversion capacities of the unitary units $A_1$, $A_2$ and using a semiconductor device with large voltage and current or a large-size transformer as components, a conversion capacity of the whole DC—DC converter can be increased.

An operation of one unitary unit $A_1$ in this DC—DC converter is as follows. Incidentally, an operation of the other unitary unit $A_2$ is similar, so that operation description of the other unitary unit $A_2$ will be omitted.

Figure 2:
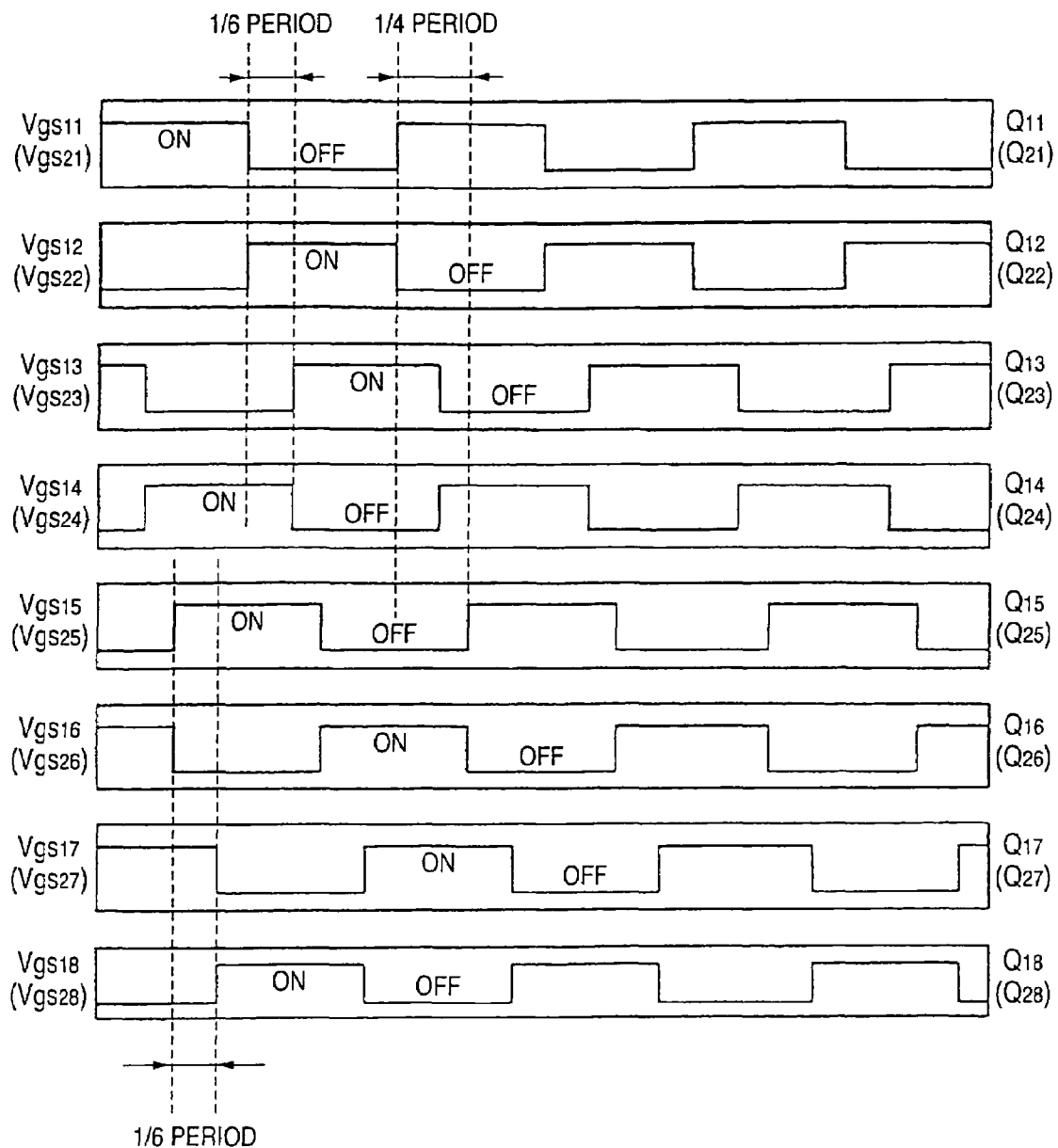
FIG. 2 is a timing chart of gate signals for turning on or off each switching element of the DC—DC converter of FIG. 1.

FIG. 2 shows a timing chart of gate signals $Vgs_{11}$ to $Vgs_{14}$, $Vgs_{15}$ to $Vgs_{18}$ for turning on or off each of the switching elements $Q_{11}$ to $Q_{14}$, $Q_{15}$ to $Q_{18}$ of the DC—DC converter. As shown in FIG. 2, the switching elements $Q_{11}$, $Q_{14}$, $Q_{12}$, $Q_{13}$ and $Q_{15}$, $Q_{18}$, $Q_{16}$, $Q_{17}$ of the conversion circuit parts 11, 12 are alternately turned on or off to obtain an AC waveform output. This AC waveform output of the conversion circuit parts 11, 12 is transformed by the transformers $Tr_{11}$, $Tr_{12}$. The the secondary side of outputs the transformers $Tr_{11}$, $Tr_{12}$ are rectified by the rectification circuit parts 13, 14 made of the diodes $D_{11}$, to $D_{14}$, $D_{15}$ to $D_{18}$ and thereby, a desired DC voltage $V_{OUT}$ is generated.

In the two conversion circuit parts 11, 12, as shown by the timing chart of FIG. 2, a switching phase of the other switching element $Q_{14}$ (the switching element $Q_{13}$ is inversion of the switching element $Q_{14}$) is delayed by a $\frac{1}{2}$n period ($\frac{1}{6}$ period in the case of this embodiment) with respect to one switching element $Q_{11}$ (the switching element $Q_{12}$ is inversion of the switching element $Q_{11}$) of the switching elements $Q_{11}$, $Q_{14}$ paired in one conversion circuit part 11.

Also, in the switching elements $Q_{11}$, $Q_{15}$ corresponding between the conversion circuit parts 11, 12, a switching phase of the switching element $Q_{15}$ (the switching element $Q_{16}$ is inversion of the switching element $Q_{15}$) of the other conversion circuit part 12 is delayed by a $\frac{1}{2}$n period ($\frac{1}{4}$ period in the case of this embodiment) with respect to the switching element $Q_{11}$.

Further, a switching phase of the other switching element $Q_{18}$ (the switching element $Q_{17}$ is inversion of the switching element $Q_{18}$) is delayed by a $\frac{1}{6}$ period with respect to one switching element $Q_{15}$ (the switching element $Q_{16}$ is inversion of the switching element $Q_{15}$) of the switching elements $Q_{15}$, $Q_{18}$ paired in the other conversion circuit part 12.

Figure 3:
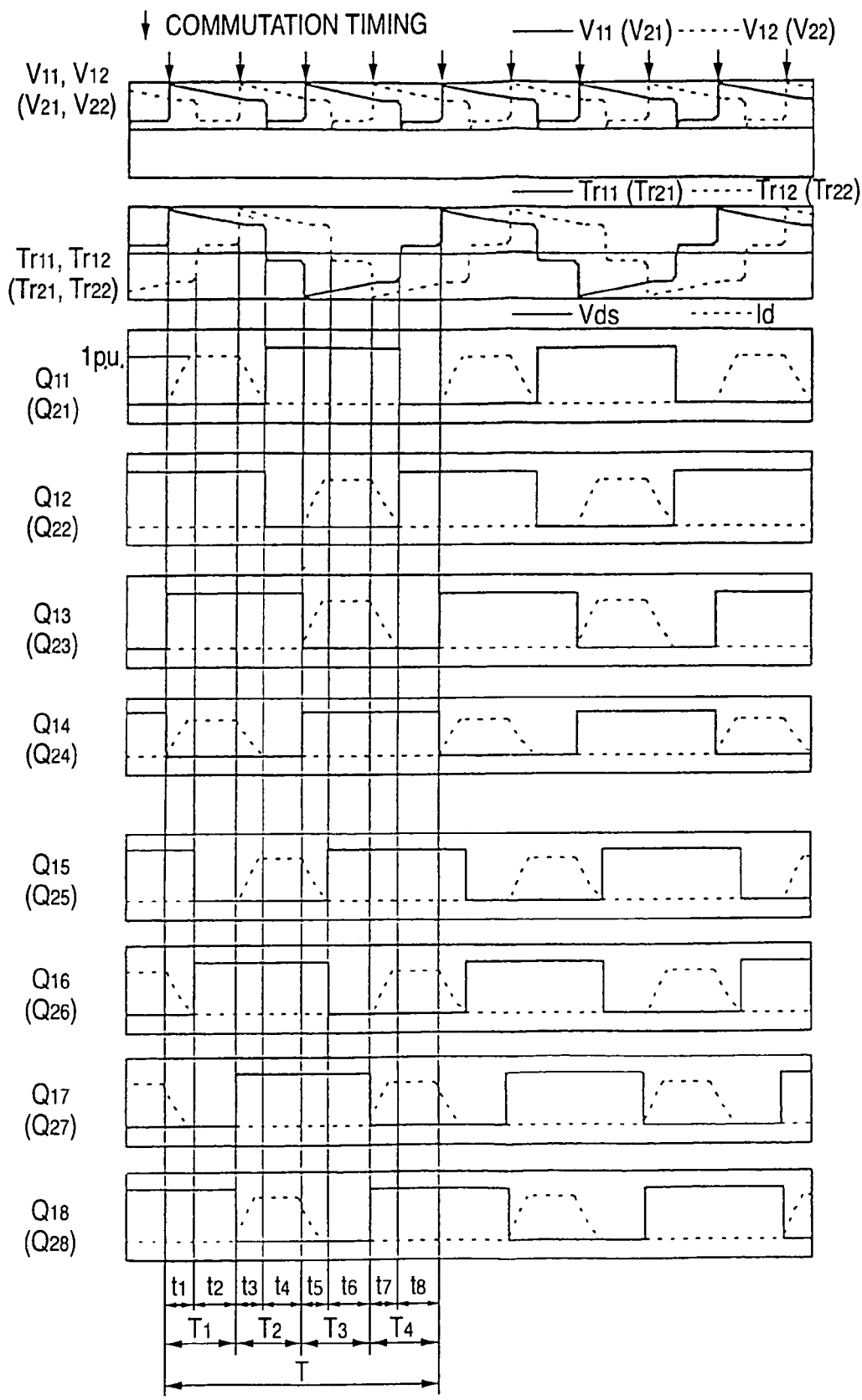
FIG. 3 is a waveform chart of output voltages of rectification circuit parts of FIG. 1, primary side voltages of transformers, voltages between drain and source of each the switching element, and drain currents.

FIG. 3 is a waveform chart of respective output voltages $V_{11}$, $V_{12}$ of the rectification circuit parts 13, 14, primary side voltages of the transformers $Tr_{11}$, $Tr_{12}$, voltages Vds between drain and source of each of the switching elements $Q_{11}$ to $Q_{14}$, $Q_{15}$ to $Q_{18}$, and drain currents Id. The switching elements $Q_{11}$ to $Q_{14}$, $Q_{15}$ to $Q_{18}$ of the conversion circuit parts 11, 12 perform switching operations by the voltages Vds between drain and source and the drain currents Id as shown in FIG. 3 (see a table of FIG. 4). Here, the table of FIG. 4 shows change and transition in current values of each of the switching elements $Q_{11}$ to $Q_{14}$, $Q_{15}$ to $Q_{18}$. Since constant electric power is supplied to a load, namely a constant current is supplied under a constant voltage output, the sum of output currents from the switching elements $Q_{11}$ to $Q_{14}$, $Q_{15}$ to $Q_{18}$ becomes a current value of 1 p.u. (per unit system) at any timing. That is, when the output current from the switching elements $Q_{11}$ to $Q_{14}$ of one conversion circuit part 11 changes from 0 to 1 p.u. at any timing, the output current from the switching elements $Q_{15}$ to $Q_{18}$ of the other conversion circuit part 12 changes from 1 to 0 p.u. Also, when the output current from the switching elements $Q_{11}$ to $Q_{14}$ of one conversion circuit part 11 is 1 p.u. at another timing, the output current from the switching elements $Q_{15}$ to $Q_{18}$ of the other conversion circuit part 12 is 0 p.u.

Incidentally, intervals $t_1$, to $t_8$ can be changed freely within conditions of $0<t_1 \leq \frac{1}{4} \cdot T$, $0 \leq t_2 < \frac{1}{4} \cdot T$, $0<t_3 \leq \frac{1}{4} \cdot T$, $0 \leq t_4 < \frac{1}{4} \cdot T$, $0 < t_5 \leq \frac{1}{4} \cdot T$, $0 \leq t_6 < \frac{1}{4} \cdot T$, $0 < t_7 \leq \frac{1}{4} \cdot T$. $0 \leq t_8 < \frac{1}{4} \cdot T$. The eight conditions are or conditions, but it is necessary to satisfy $t_1+t_2+t_3+t_4+t_5+t_6+t_7+t_8=T$. At intervals $t_1$, $t_3$, $t_5$, $t_7$ in which a current increases or decreases, a waveform depends on a circuit constant, so that it is actually limited to a range in which switching loss does not occur.

Absolute values of values obtained by multiplying primary side voltages (the second from the uppermost line of FIG. 3) of the transformers $Tr_{11}$, $Tr_{12}$ by a transformation ratio of the transformers $Tr_{11}$, $Tr_{12}$ by switching operations of each of the switching elements $Q_{11}$ to $Q_{14}$, $Q_{15}$ to $Q_{18}$ can be obtained as output voltages $V_{11}$, $V_{12}$. That is, values (the uppermost line of FIG. 3) obtained by turning waveforms of the primary side voltages at a zero point can be obtained as output voltages $V_{11}$, $V_{12}$ in which secondary side voltages of the transformers $Tr_{11}$, $Tr_{12}$ are rectified by the diodes $D_{11}$ to $D_{14}$, $D_{15}$ to $D_{18}$ of the rectification circuit parts 13, 14. Further, output voltages $V_{21}$, $V_{22}$ of the rectification circuit parts 23, 24 can be obtained by the same way. A DC voltage $V_{OUT}$ is generated by tracing output voltages $V_1(=V_{11}+V_{21})$, $V_2(=V_{12}+V_{22})$ which are obtained respectively by connecting the output voltages of the rectification circuit parts 13, 23 in series and by connecting the output voltages of the rectification circuit parts 14, 24 in series at the highest voltage value by commutation. This commutation is repeatedly performed in order of the switching elements $Q_{11}$, $Q_{14}$, the switching elements $Q_{15}$, $Q_{18}$, the switching elements $Q_{12}$, $Q_{13}$, the switching elements $Q_{16}$, $Q_{17}$, the switching elements $Q_{11}$, $Q_{14}$ with timing by arrows of FIG. 3.

By turning on or off these switching elements $Q_{11}$ to $Q_{14}$, $Q_{15}$ to $Q_{18}$ with timing at which the switching phase is shifted, such state in which the voltages Vds between drain and source are applied while the drain currents Id flow through the switching elements $Q_{11}$ to $Q_{14}$, $Q_{15}$ to $Q_{18}$ will not take place, and thus, the switching loss will not also occur. Also, the switching elements $Q_{13}$, $Q_{14}$, $Q_{17}$, $Q_{18}$ for triggering the commutation determine timing of the commutation, and even when these switching elements $Q_{13}$, $Q_{14}$, $Q_{17}$, $Q_{18}$ are turned on by giving gate signals, the drain currents Id do not reach the peak current immediately after the commutation due to leakage reactance of the transformers $Tr_{11}$, $Tr_{12}$ and a rise in the current is suppressed, so that turn-on switching loss does not occur.

Also, by inserting and connecting the series capacitors $C_{11}$, $C_{12}$ between the conversion circuit parts 11, 12 and the transformers $Tr_{11}$, $Tr_{12}$, droop (slope) is provided in a flat part of an output voltage of the conversion circuit parts 11, 12 and a voltage waveform with a high rise portion is formed and thereby a difference in voltage is increased before and after the time of commutation timing to ensure commutation operations. Further, a DC component included due to variations in on resistance or switching speed by individual differences in the switching elements $Q_{11}$ to $Q_{14}$, $Q_{15}$ to $Q_{18}$ can be cut to prevent DC bias excitation of the transformers $Tr_{11}$, $Tr_{12}$.

In the DC—DC converter of this embodiment, the unitary unit $A_1$ comprises a pair of the conversion circuit parts 11, 12, the series capacitors $C_{11}$, $C_{12}$, the transformers $Tr_{11}$, $Tr_{12}$ and the rectification circuit parts 13, 14. The unitary unit $A_2$ comprises a pair of the conversion circuit parts 21, 22, the series capacitors $C_{21}$, $C_{22}$, the transformers $Tr_{21}$, $Tr_{22}$ and the rectification circuit parts 23, 24. The unitary units $A_1$, $A_2$ are connected in parallel with the DC power source E. An LC smoothing circuit part 15 is connected in common with the output sides of their rectification circuit parts 13, 14, 23, 24.

The transformer secondary sides of one rectification circuit parts 13, 23 in two groups of the unitary units $A_1$, $A_2$ are connected in series between the two groups and also the transformer secondary sides of the other rectification circuit parts 14, 24 are connected in series between the two groups. Thus, by using a configuration in which the transformer secondary sides of one rectification circuit parts 13, 23 are connected in series between two groups of the unitary units $A_1$, $A_2$ and also the transformer secondary sides of the other rectification circuit parts 14, 24 are connected in series between two groups of the unitary units $A_1$, $A_2$, even when there is a slight difference in output voltages of each of the conversion circuit parts 11, 12, 21, 22 connected in parallel due to an increase in a conversion capacity of the DC—DC converter, output shares of the transformer secondary sides of one rectification circuit parts 13, 23 and the transformer secondary sides of the other rectification circuit parts 14, 24 can be equalized, so that an output current of the DC—DC converter does not become an unbalance state.

Figure 5:
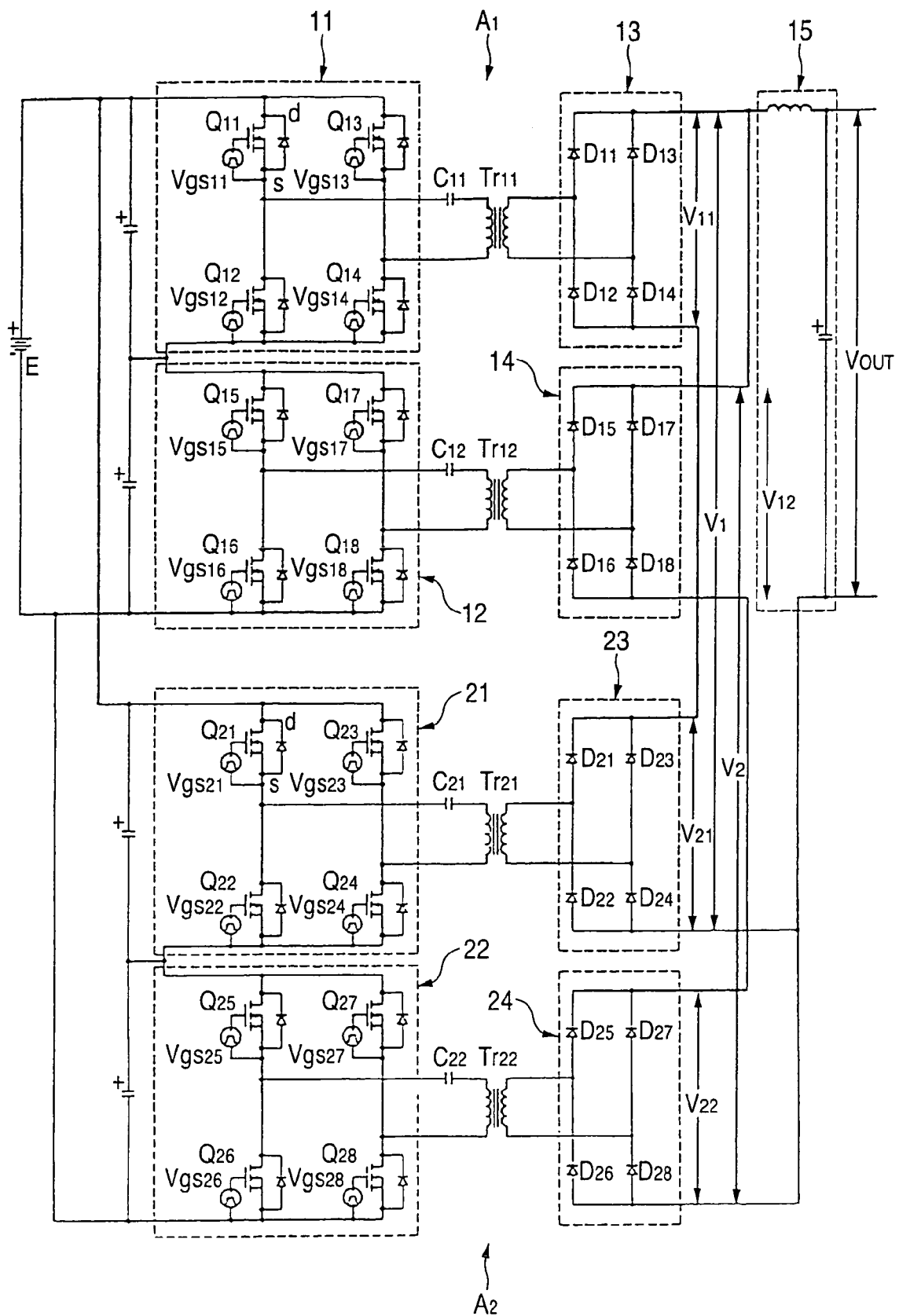
FIG. 5 is a circuit diagram showing a DC—DC converter in which two groups of unitary units having a pair of conversion circuit parts connected in series are connected in parallel in another embodiment of the invention.
Figure 6:
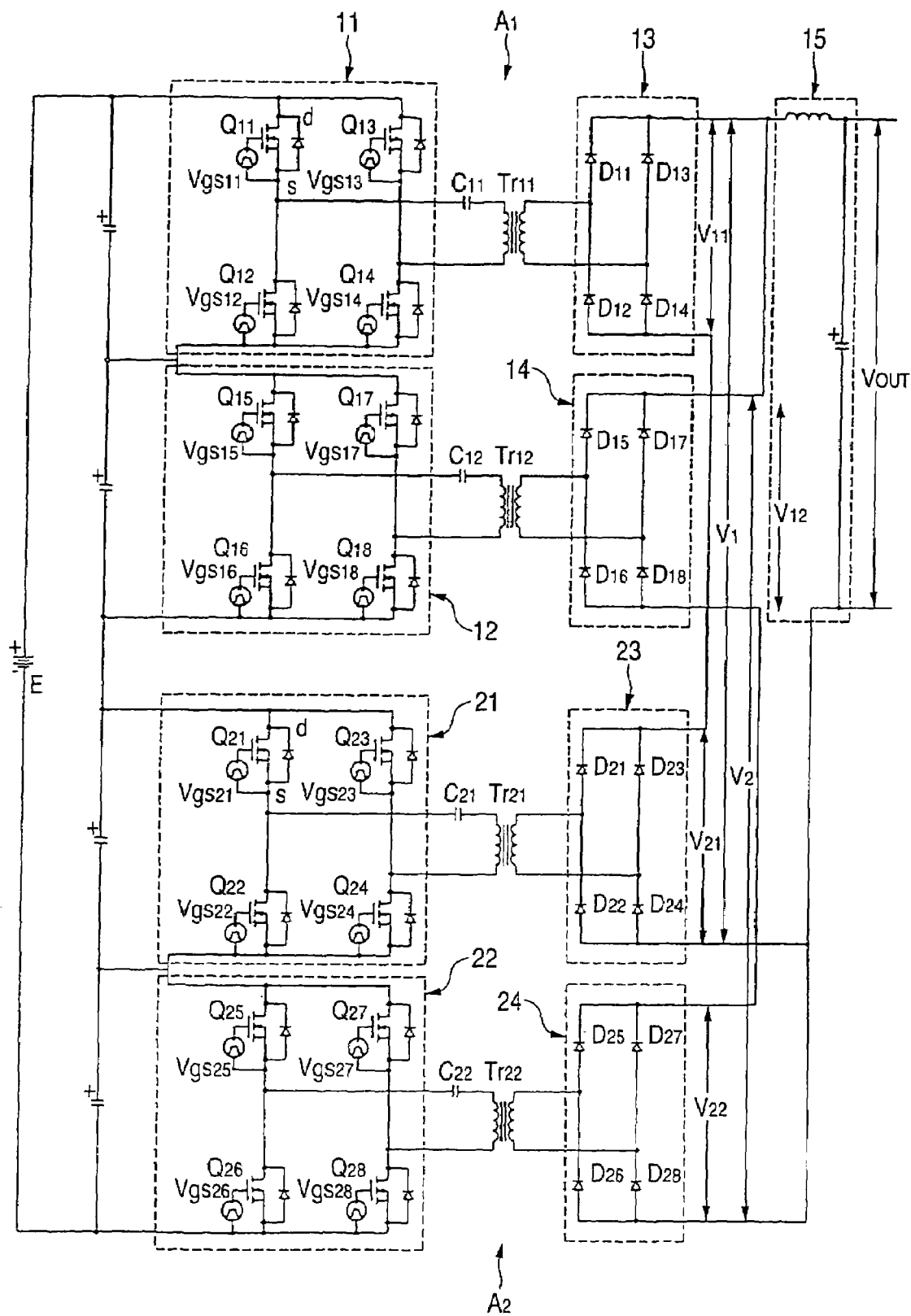
FIG. 6 is a circuit diagram showing a DC—DC converter in which two groups of unitary units having a pair of conversion circuit parts connected in series are connected in series in a further embodiment of the invention.

Incidentally, the DC—DC converter in the embodiment of FIG. 1 has a configuration in which each of a pair of the conversion circuit parts 11, 12 in the unitary unit $A_1$ and a pair of the conversion circuit parts 21, 22 in the unitary unit $A_2$ is connected in parallel with the DC power source E, but the invention is not limited to this. As shown in FIGS. 5 and 6, a configuration in which each of a pair of the conversion circuit parts 11, 12 in the unitary unit $A_1$ and a pair of the conversion circuit parts 21, 22 in the unitary unit $A_2$ is connected in series with the DC power source E can also be used. Thus, in two groups of the unitary units $A_1$, $A_2$ having a pair of the conversion circuit parts 11, 12, 21, 22 which are connected in series with the DC power source E, any of a configuration connected in parallel with the DC power source E (see FIG. 5) or a configuration connected in series with the DC power source E (see FIG. 6) can be used.

According to the invention, by providing n groups of unitary units comprising a pair of conversion circuit parts, series capacitors, transformers and rectification circuit parts with respect to a DC power source, a conversion capacity of a DC—DC converter can be increased. In the case of increasing the conversion capacity of this DC—DC converter, by connecting the transformer secondary sides of one rectification circuit parts in n groups of the unitary units in series among the n groups and also connecting the transformer secondary sides of the other rectification circuit parts in series among the n groups, even when there is a slight difference in output voltages of each conversion circuit part, output shares of the transformer secondary sides of one rectification circuit parts and the transformer secondary sides of the other rectification circuit parts can be equalized without the need for a control circuit of current or a component with high accuracy. Therefore, an output current of the DC—DC converter does not become an unbalance state and a DC—DC converter with high performance can be provided.

Incidentally, in the DC—DC converter in the embodiments of FIGS. 1, 5 and 6, series capacitors, rectification circuit parts as well as the conversion circuit parts and transformers are considered as a unitary unit, with respect to a DC power source, but the invention is not limited to this. An inverter unit IU having a pair of conversion circuit parts and a pair of transformers can be considered as a unitary unit, with respect to a DC power source and a pair of the rectification circuit parts.

Figure 7:
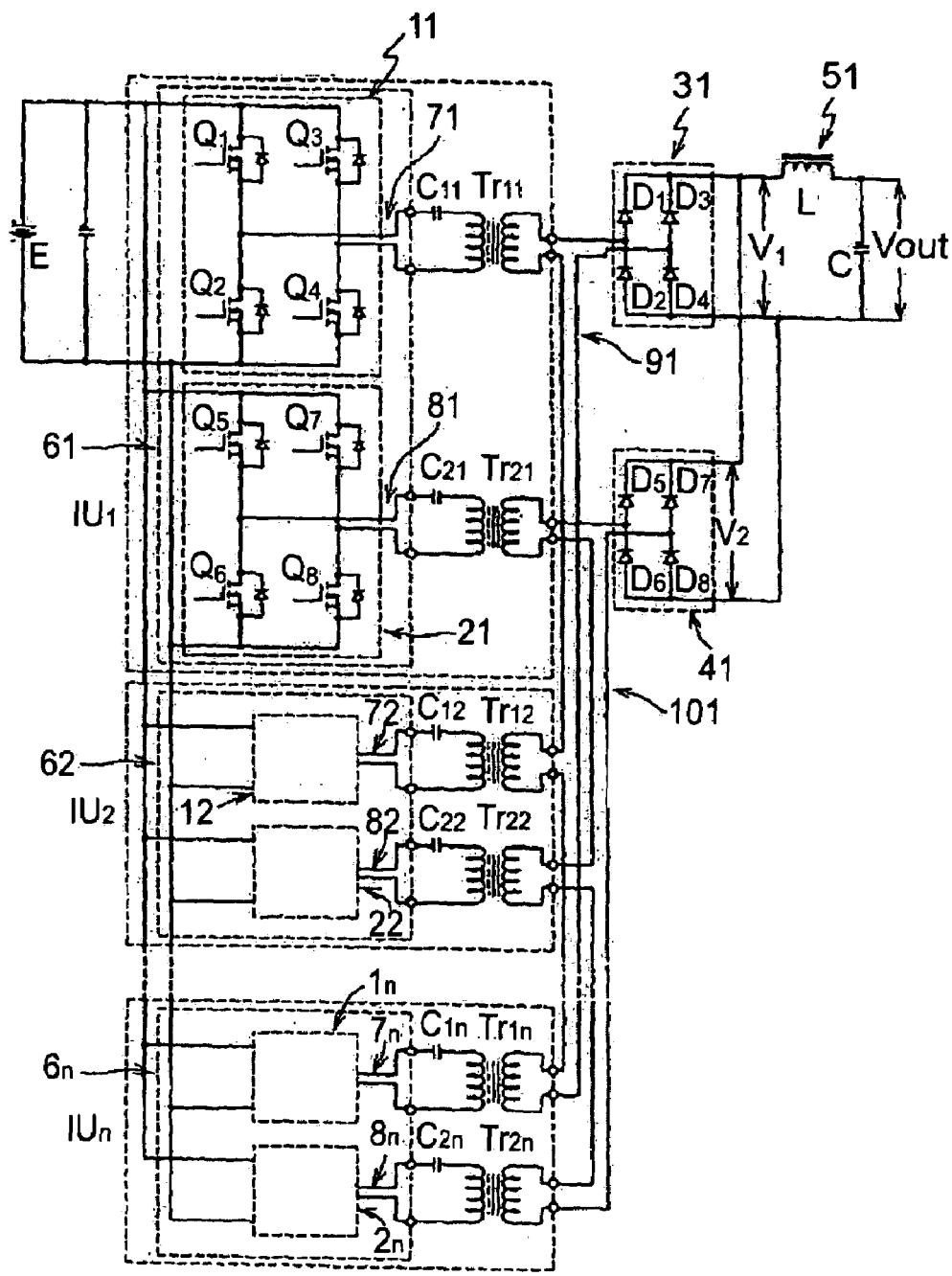
FIG. 7 is a circuit diagram of a DC—DC converter in an embodiment of the invention.
Figure 17:
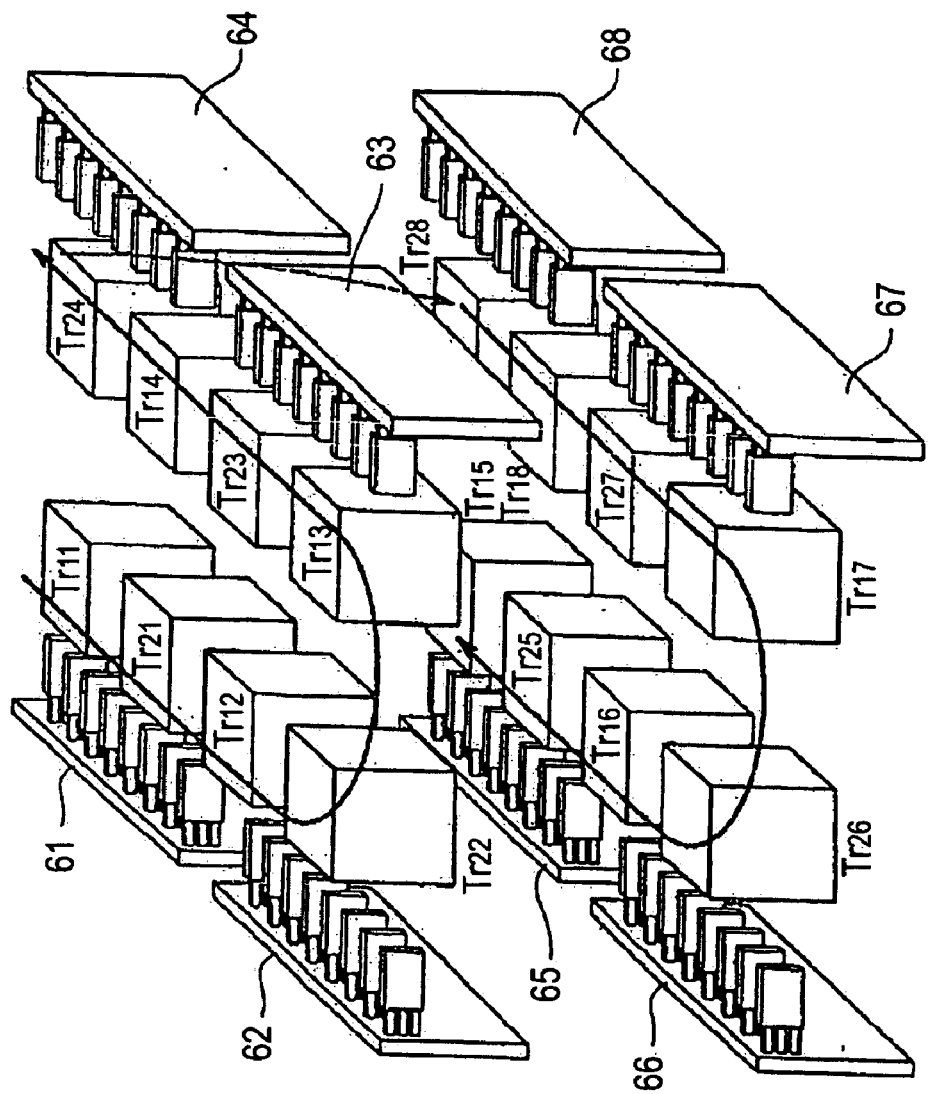
FIG. 17 is another example in which eight groups of inverter units in another embodiment of the invention are configured at multiple stages, and is a perspective view showing the wiring state and the arrangement relation of the transformers shown in FIG. 11 and the placement relation between the inverter boards and the transformers shown in FIG. 13.
Figure 18:
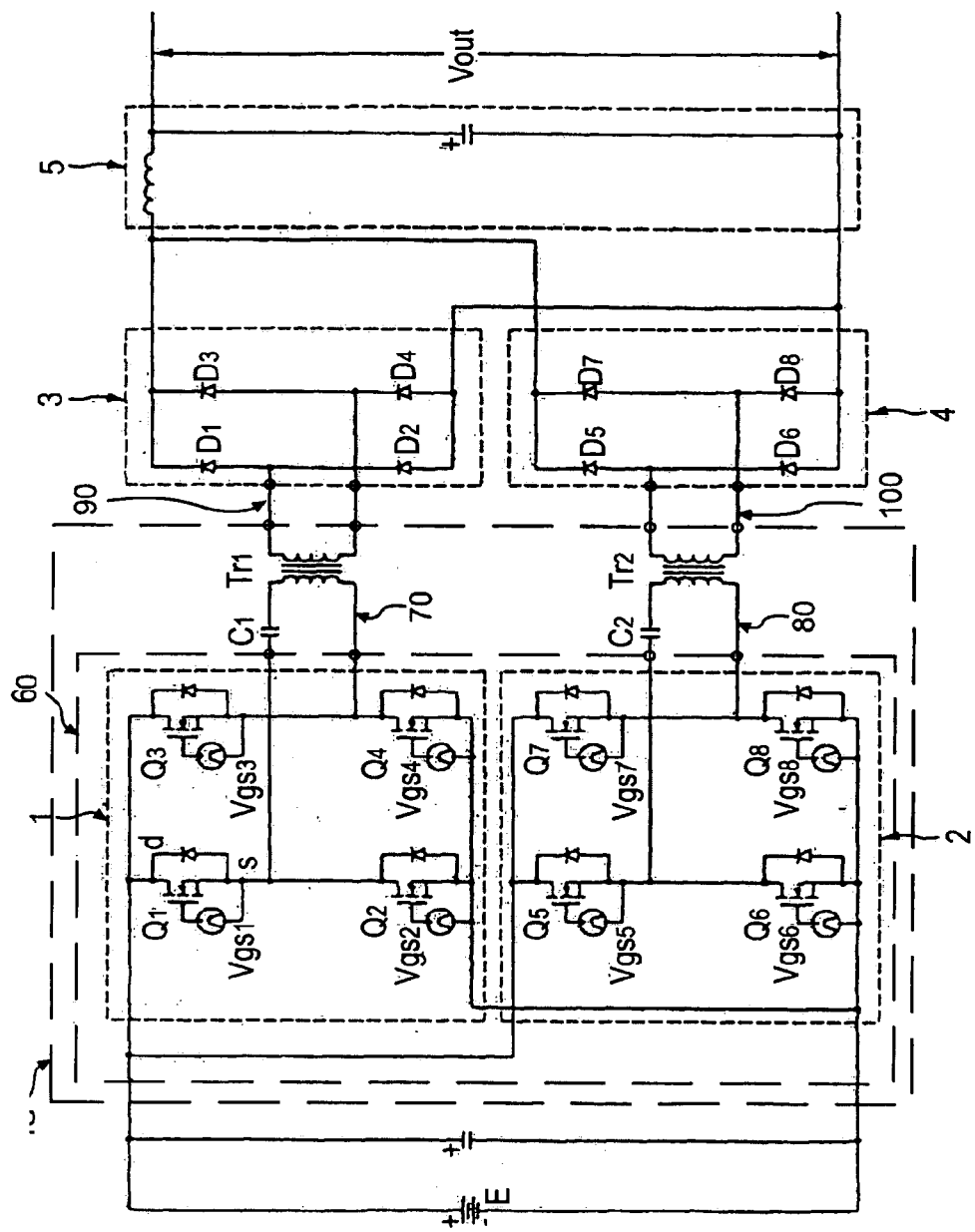
FIG. 18 is a circuit diagram showing a related-art example of a DC—DC converter.
Figure 19:
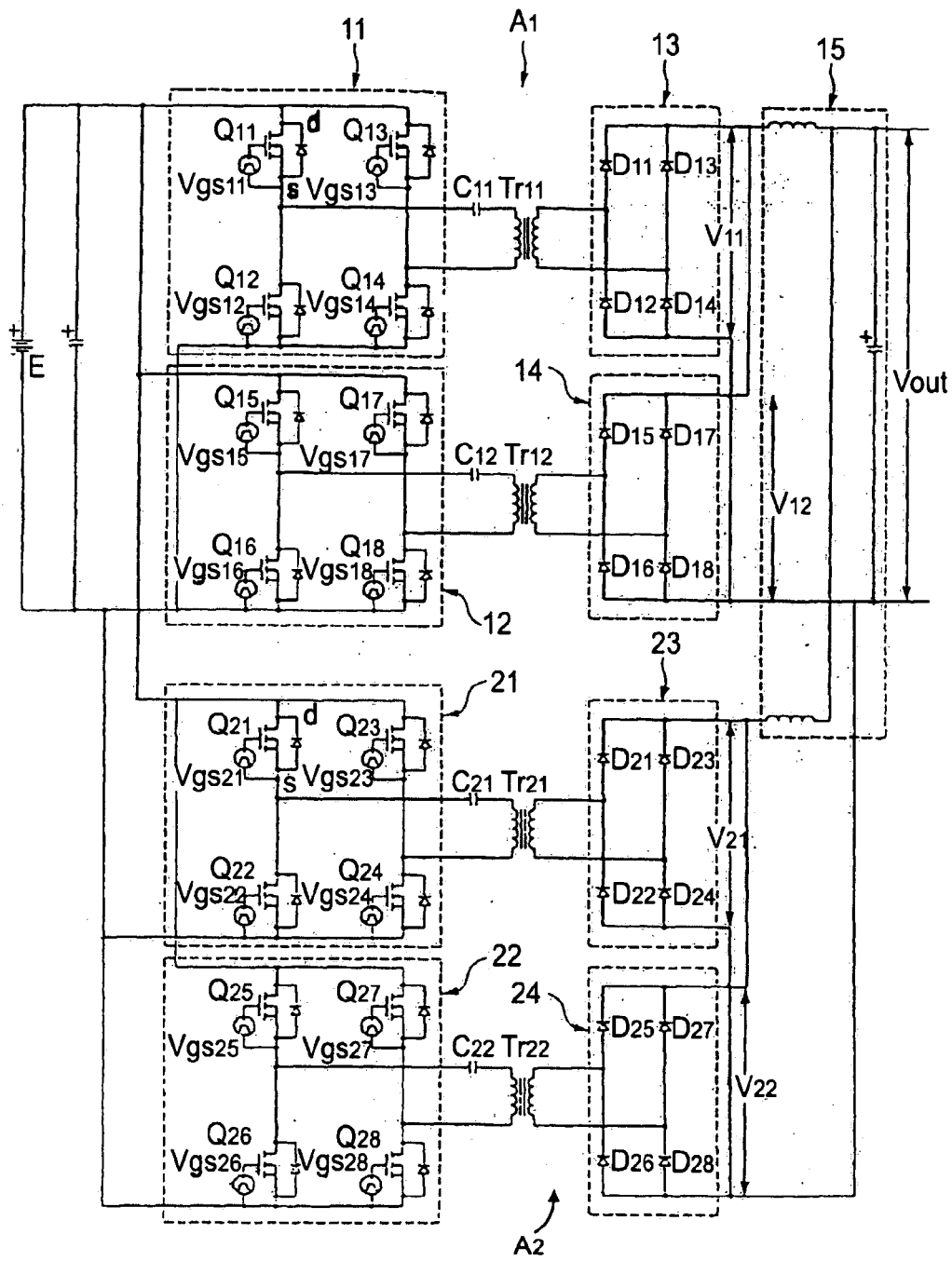
FIG. 19 is a circuit diagram showing one example of a DC—DC converter of a premise of the invention.
Figure 20:
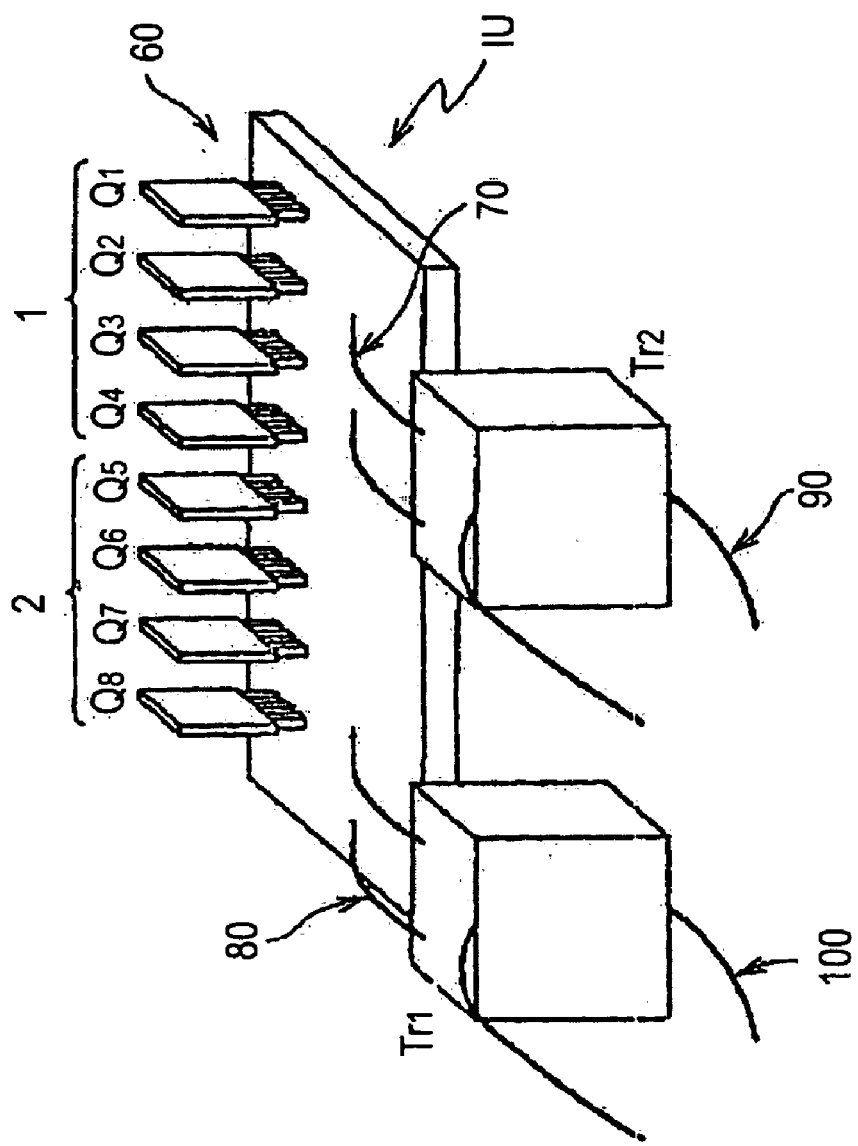
FIG. 20 is a perspective view showing components of the DC—DC converter of FIG. 18.

As shown in FIG. 17, the DC—DC converter of this embodiment provides inverter units $IU_1$ to $IU_n$ comprising inverter boards 61 to 6n and a pair of transformers $Tr_{11}$, to $Tr_{1n}$, $Tr_{21}$ to $Tr_{2n}$. The inverter boards 61 to 6n mount a pair of conversion circuit parts 11 to 1n, 21 to 2n for converting a power source voltage of a DC power source E into an AC by two pairs of switching elements $Q_1$, $Q_4$, $Q_2$, $Q_3$ and $Q_5$, $Q_8$, $Q_6$, $Q_7$ (for example, MOS-FET, bipolar transistor or IGBT) of a full bridge configuration. Primary sides of the pair of transformers $Tr_{11}$, to $Tr_{1n}$, $Tr_{21}$ to $Tr_{2n}$ are respectively connected to outputs of each of the conversion circuit parts 11 to 1n, 21 to 2n of the inverter boards 61 to 6n, and secondary sides thereof are respectively connected to inputs of rectification circuit parts 31, 41 described below as shown in FIG. 7. Incidentally, series capacitors $C_{11}$, to $C_{1n}$, $C_{21}$ to $C_{2n}$ are inserted and connected between the output sides of each of the conversion circuit parts 11 to 1n, 21 to 2n and the primary sides of the transformers $Tr_{11}$, to $Tr_{1n}$, $Tr_{21}$ to $Tr_{2n}$.

In this DC—DC converter, n groups of the inverter units $IU_1$ to $IU_n$ are incorporated by connecting a plurality of the inverter units $IU_1$ to $IU_n$ constructed of the configuration described above in parallel with the DC power source E. By adopting a structure in which n groups of the inverter units $IU_1$ to $IU_n$ are incorporated thus, a capacity of the DC—DC converter becomes larger by implementing an n-fold increase in a conversion capacity in one inverter unit.

The rectification circuit parts 31, 41 provided in common with n groups of the inverter units $IU_1$ to $IU_n$ to the secondary sides of transformers $Tr_{11}$, to $Tr_{1n}$, $Tr_{21}$ to $Tr_{2n}$, described above comprise two pairs of diodes $D_1$, $D_4$, $D_2$, $D_3$ and $D_5$, $D_8$, $D_6$, $D_7$. Also, an LC smoothing circuit 51 is connected in common with the output sides of the rectification circuit parts 31, 41.

Figure 8:
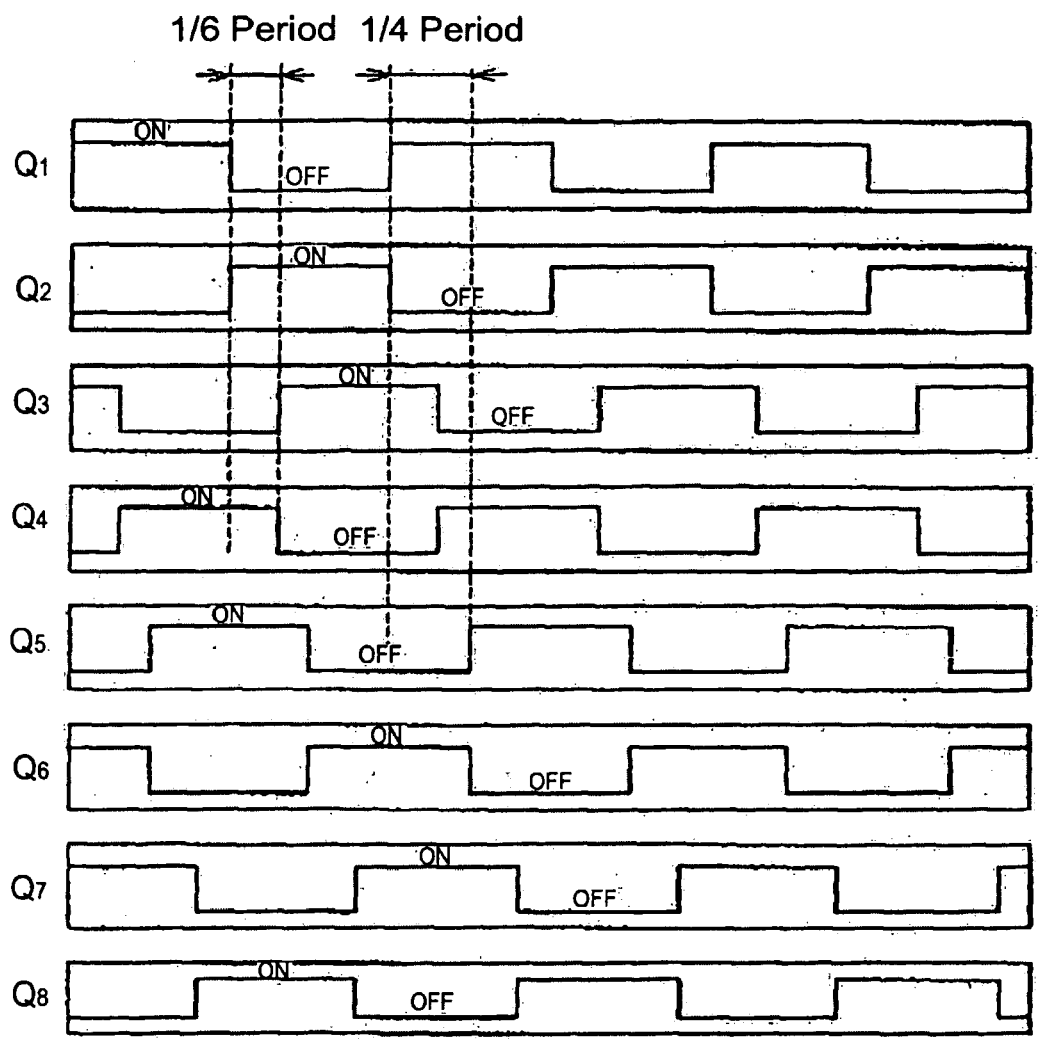
FIG. 8 is a timing chart of gate signals for turning on or off each switching element of the DC—DC converter of FIG. 7.

In this DC—DC converter, the switching elements $Q_1$, $Q_4$, $Q_2$, $Q_3$ and $Q_5$, $Q_8$, $Q_6$, $Q_7$ of the conversion circuit parts 11 to 1n, 21 to 2n are alternately turned on or off to obtain an AC waveform output as shown by a timing chart of FIG. 8. This AC waveform output of the conversion circuit parts 11 to 1n, 21 to 2n is transformed by the transformers $Tr_{11}$, to $Tr_{1n}$, $Tr_{21}$ to $Tr_{2n}$, and the secondary side outputs of the transformers $Tr_{11}$, to $Tr_{1n}$, $Tr_{21}$ to $Tr_{2n}$, are rectified by the rectification circuit parts 31, 41 and also are smoothed by the LC smoothing circuit part 51 and thereby, a desired DC voltage $V_{OUT}$ is generated.

In each of the inverter units $IU_1$ to $IU_n$ as shown by the timing chart of FIG. 8, a switching phase of the other switching element $Q_4$ (the switching element $Q_3$ is inversion of the switching element $Q_4$) is delayed by, for example, a ⅙ period with respect to one switching element $Q_1$ (the switching element $Q_2$ is inversion of the switching element $Q_1$) of the switching elements $Q_1$, $Q_4$ paired in one conversion circuit parts 11 to 1n.

Also, in the switching elements $Q_1$, $Q_5$ corresponding between the conversion circuit parts 11 to 1n and 21 to 2n, a switching phase of the switching element $Q_5$ (the switching element $Q_6$ is inversion of the switching element $Q_5$) of the other conversion circuit parts 21 to 2n is delayed by, for example, a ¼ period with respect to the switching element $Q_1$.

Further, a switching phase of the other switching element $Q_8$ (the switching element $Q_7$ is inversion of the switching element $Q_8$) is delayed by a ⅙ period with respect to one switching element $Q_5$ of the switching elements $Q_5$, $Q_8$ paired in the other conversion circuit parts 21 to 2n.

Figure 9:
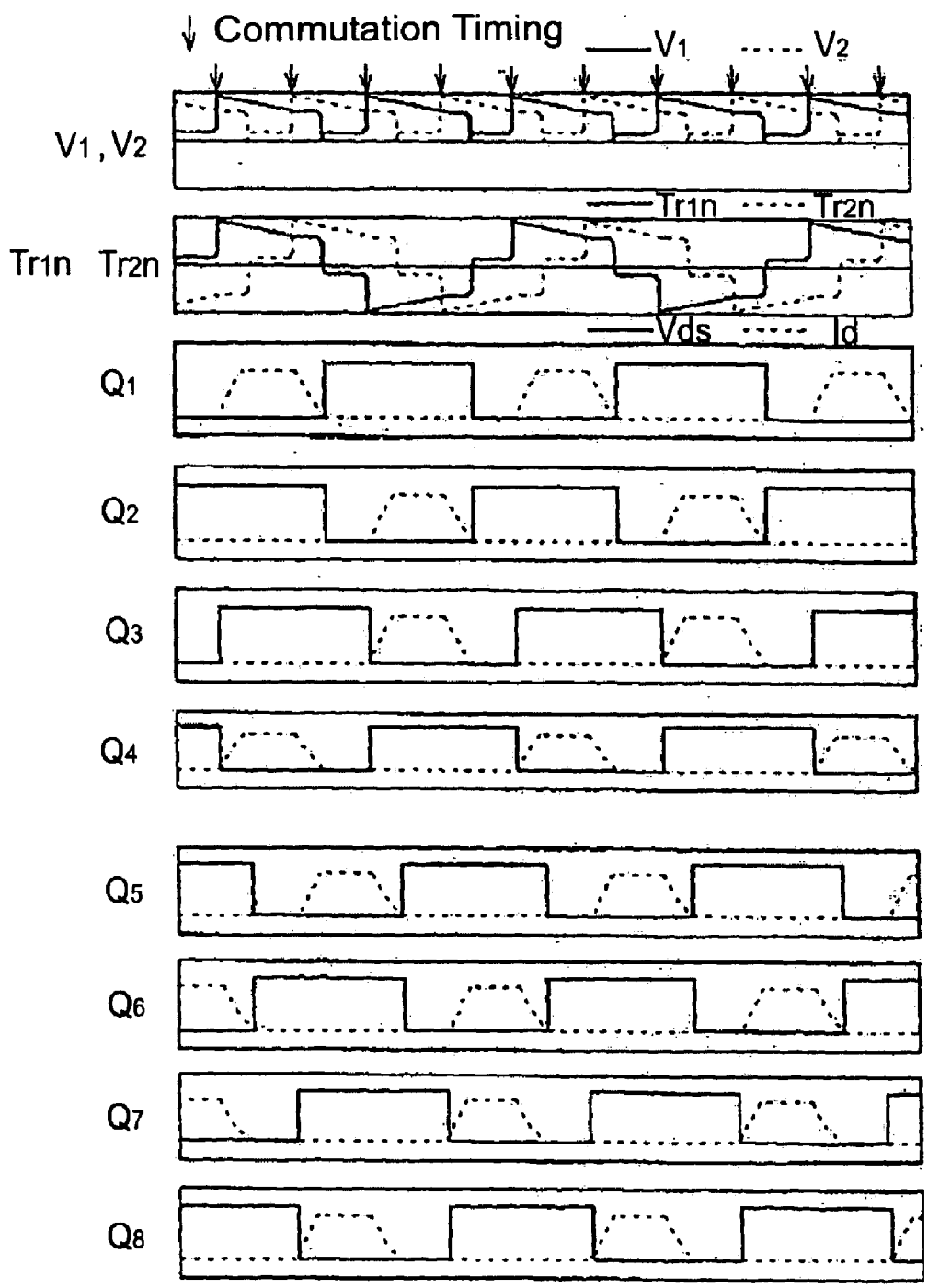
FIG. 9 is a waveform chart of drain currents, voltages between drain and source of each the switching element, primary side voltages of transformers and output voltages of rectification circuit parts of FIG. 7.

The switching elements $Q_1$ to $Q_4$, $Q_5$ to $Q_8$ of each of the conversion circuit parts 11 to 1n, 21 to 2n perform switching operations by voltages $V_{ds}$ between drain and source and drain currents $I_d$ as shown in FIG. 9. Absolute values of values obtained by multiplying primary side voltages (the second from the uppermost line of FIG. 9) of the transformers $Tr_{11}$, to $Tr_{1n}$, $Tr_{21}$ to $Tr_{2n}$ by a transformation ratio of the transformers $Tr_{11}$, $Tr_{12}$ by switching operations of each of the switching elements $Q_1$ to $Q_4$, $Q_5$ to $Q_8$, that is, values (the uppermost line of FIG. 9) obtained by turning waveforms of the primary side voltages at a zero point result in output voltages $V_1$, $V_2$ obtained as results in which secondary side voltages of the transformers $Tr_{11}$ to $Tr_{1n}$, $Tr_{21}$ to $Tr_{2n}$, are rectified by the rectification circuit parts 31, 41.

A load voltage $V_{OUT}$ is generated by tracing the output voltages $V_1$, $V_2$ of the rectification circuit parts 31, 41 at the highest voltage value by commutation. This commutation is repeatedly performed in order of the switching elements $Q_1$, $Q_4$, the switching elements $Q_5$, $Q_8$, the switching elements $Q_2$, $Q_3$, the switching elements $Q_6$, $Q_7$, the switching elements $Q_1$, $Q_4$ with timing shown by arrows of FIG. 9.

Each of the inverter units $IU_1$ to $IU_n$ of this DC—DC converter provides a configuration in which the primary sides of a pair of the transformers $Tr_{11}$, to $Tr_{1n}$, $Tr_{21}$ to $Tr_{2n}$, are respectively connected to the inverter boards 61 to 6n for mounting a pair of the conversion circuit parts 11 to 1n, 21 to 2n by lead wires 71 to 7n, 81 to 8n and the rectification circuit parts 31, 41 are connected to the secondary sides of the pair of the transformers $Tr_{11}$, to $Tr_{1n}$, $Tr_{21}$ to $Tr_{2n}$, by lead wires 91, 101 (see FIG. 7).

Each of the inverter units $IU_1$ to $IU_n$ is configured so that the secondary sides of one transformers $Tr_{11}$, to $Tr_{1n}$, are connected in series among n groups by the lead wire 91 and also the secondary sides of the other transformers $Tr_{21}$ to $Tr_{2n}$, are connected in series among n groups by the lead wire 101. By using such a configuration, even when there is a slight difference in output voltages of each of the conversion circuit parts 11 to 1n, 21 to 2n because the conversion circuit parts 11 to 1n, 21 to 2n which are a voltage source are connected in parallel, output shares of the secondary sides of one transformers $Tr_{11}$, to $Tr_{1n}$, and the secondary sides of the other transformers $Tr_{21}$ to $Tr_{2n}$ can be equalized, so that a situation in which a cross current flows in the conversion circuit parts 11 to 1n, 21 to 2n and due to this cross current, an output current of the DC—DC converter increases or decreases and becomes an unbalance state does not occur.

Figure 10:
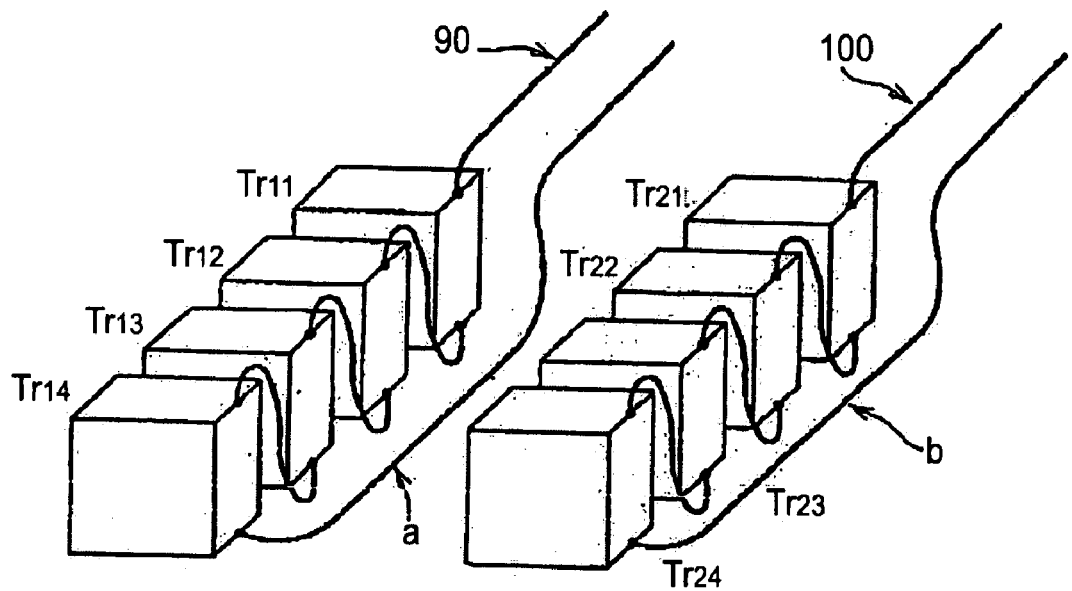
FIG. 10 is a perspective view showing one example of a wiring state and an arrangement relation of transformers.

Here, for example, means shown in FIG. 10 is contemplated as wiring connection between the secondary sides of one transformers $Tr_{11}$, to $Tr_{1n}$, and the secondary sides of the other transformers $Tr_{21}$ to $Tr_{2n}$, among n groups of the inverter units $IU_1$ to $IU_n$. Incidentally, the case of four groups of inverter units $IU_1$ to $IU_4$ is shown in the drawing. That is, one transformers $Tr_{11}$, to $Tr_{14}$ and the other transformers $Tr_{21}$ to $Tr_{24}$ are placed on a straight line and the secondary sides of each of the transformers $Tr_{11}$, to $Tr_{14}$, $Tr_{21}$ to $Tr_{24}$ are connected in series by lead wires 90, 100. However, in this case, lead wires (a, b portions shown in the drawing) for feedback having extra lengths are required and a resistance value increases by the lengths and suitable means is not provided.

Figure 11:
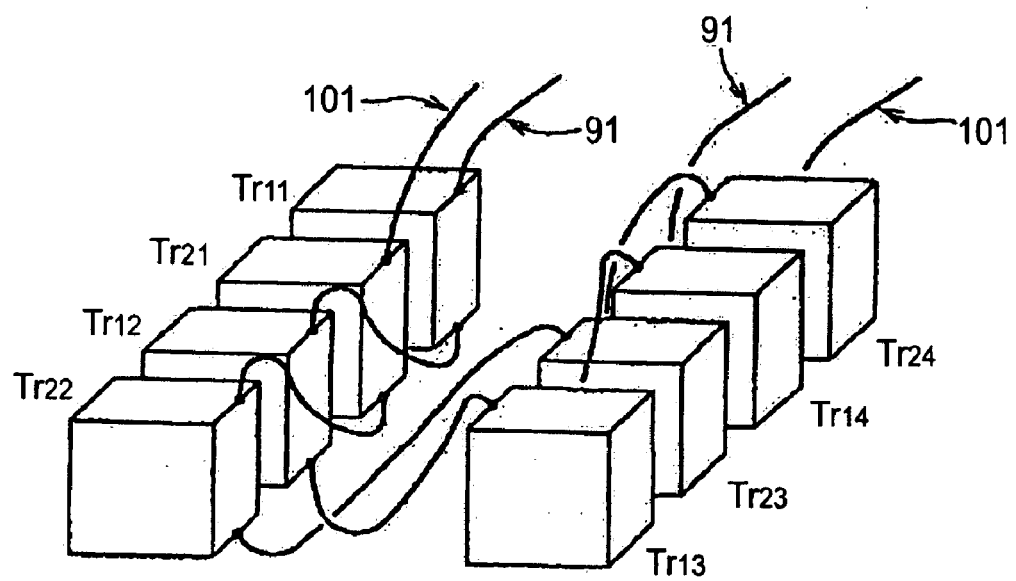
FIG. 11 is a perspective view showing a wiring state and an arrangement relation of transformers of FIG. 7 in the embodiment of the invention.

Therefore, there is, for example, means shown in FIG. 11 as suitable wiring connection between the secondary sides of one transformers $Tr_{11}$, to $Tr_{1n}$, and the secondary sides of the other transformers $Tr_{21}$ to $Tr_{2n}$, among n groups of the inverter units $IU_1$ to $IU_n$. Incidentally, the case of four groups of inverter units $IU_1$ to $IU_4$ is shown in the drawing. That is, in a state in which one transformers $Tr_{11}$, to $Tr_{14}$ and the other transformers $Tr_{21}$ to $Tr_{24}$ are arranged alternately, the transformers are placed so that an arrangement end point is fed back to an arrangement start point, and leading of the lead wire 91 in the transformers $Tr_{11}$, $Tr_{21}$ located at the arrangement start point is brought close to leading of the lead wire 101 out of the transformers $Tr_{14}$, $Tr_{24}$ located at the arrangement end point and the secondary sides of each of the transformers $Tr_{11}$, to $Tr_{14}$, $Tr_{21}$ to $Tr_{24}$ are connected in series by the lead wires 91, 101.

Thus, when one transformers $Tr_{11}$, to $Tr_{14}$ and the other transformers $Tr_{21}$ to $Tr_{24}$ are placed so that the arrangement end point is fed back to the arrangement start point and leading of the lead wire 91 in the transformers $Tr_{11}$, $Tr_{21}$ located at the arrangement start point is brought close to leading of the lead wire 101 out of the transformers $Tr_{14}$, $Tr_{24}$ located at the arrangement end point and the secondary sides of each of the transformers $Tr_{11}$, to $Tr_{14}$, $Tr_{21}$ to $Tr_{24}$ are connected in series by the lead wires 91, 101, the lead wires (see the a, b portions of FIG. 10) for feedback having extra lengths are not required and an increase in a resistance value can be suppressed and also wiring work such as routing of the lead wires can be simplified.

Figure 12:
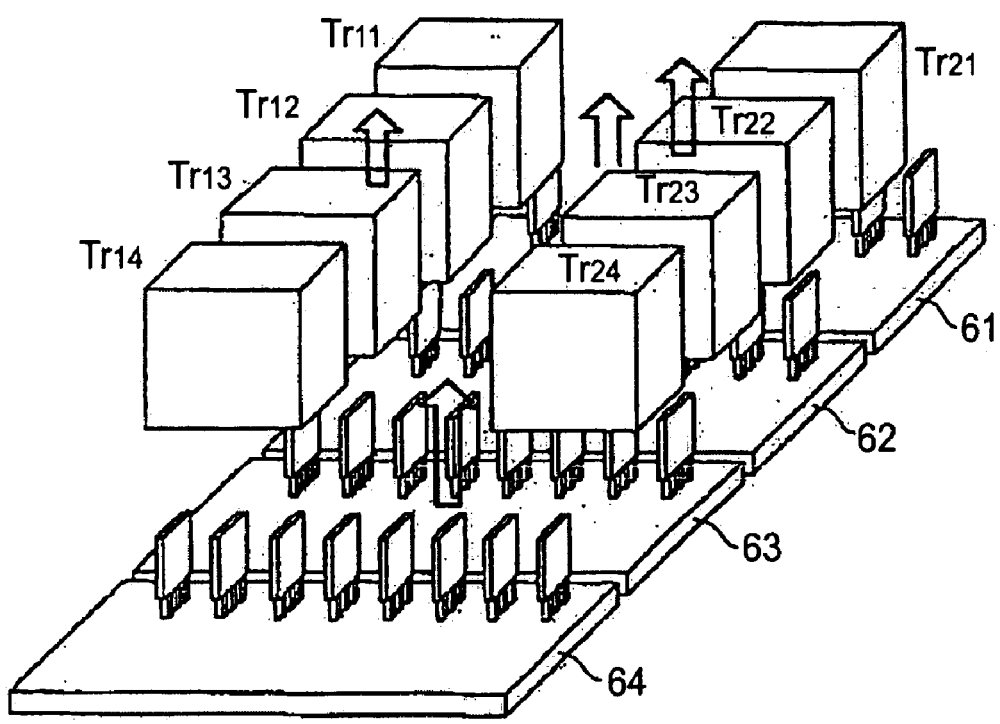
FIG. 12 is a perspective view showing the wiring state and the arrangement relation of the transformers shown in FIG. 10 and a placement relation between inverter boards and the transformers.

Also, for example, means shown in FIG. 12 is contemplated as a placement relation between the inverter boards 61 to 6n and the transformers $Tr_{11}$, to $Tr_{1n}$, $Tr_{21}$ to $Tr_{2n}$. Incidentally, the drawing shows the case of four groups of inverter units $IU_1$ to $IU_4$, and shows the case of placing each of the transformers $Tr_{11}$, to $Tr_{14}$, $Tr_{21}$ to $Tr_{24}$ in an arrangement relation of FIG. 10, and illustration of wiring of the transformers $Tr_{11}$, to $Tr_{14}$, $Tr_{21}$ to $Tr_{24}$ by the lead wires 90, 100 shown in FIG. 10 is omitted.

In FIG. 12, each of the transformers $Tr_{11}$, to $Tr_{14}$, $Tr_{21}$ to $Tr_{24}$ is placed over the inverter boards 61 to 64. In this case, since the transformers $Tr_{11}$, to $Tr_{14}$, $Tr_{21}$ to $Tr_{24}$ which are heat generation sources are placed over the inverter boards 61 to 64 which are heat generation sources, heat dissipation characteristics are bad as shown by outline arrows, so that suitable means is not provided.

Figure 13:
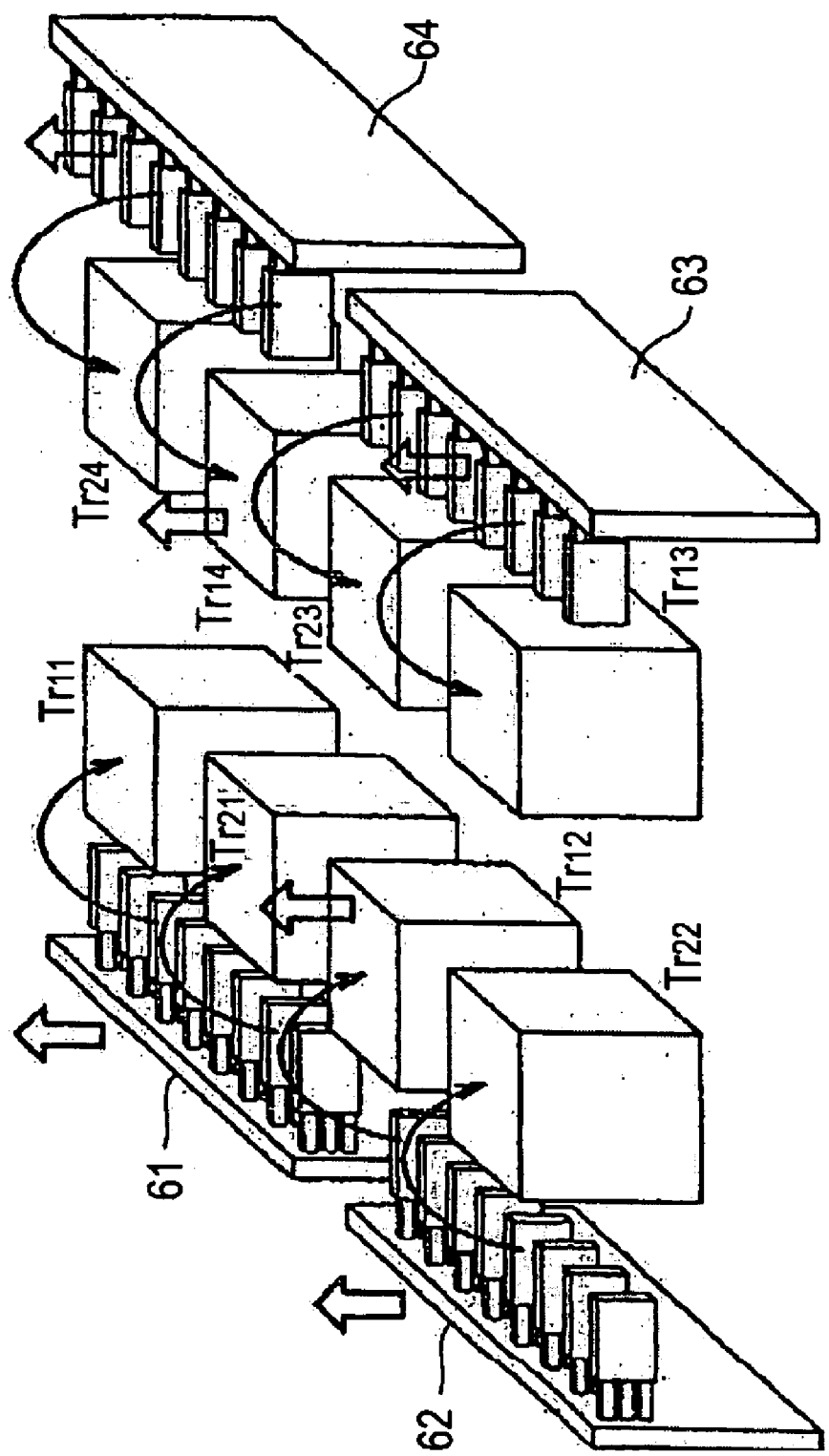
FIG. 13 is a perspective view showing the wiring state and the arrangement relation of the transformers shown in FIG. 11 and a placement relation between inverter boards and the transformers in the embodiment of the invention.

Therefore, there is, for example, means shown in FIG. 13 as a suitable placement relation between the inverter boards 61 to 6n and the transformers $Tr_{11}$, to $Tr_{1n}$, $Tr_{21}$ to $Tr_{2n}$. Incidentally, the drawing shows the case of four groups of inverter units $IU_1$ to $IU_4$, and shows the case of placing each of the transformers $Tr_{11}$, to $Tr_{14}$, $Tr_{21}$ to $Tr_{24}$ in an arrangement relation of FIG. 11, and illustration of wiring of the transformers $Tr_{11}$, to $Tr_{14}$, $Tr_{21}$ to $Tr_{24}$ by the lead wires 91, 101 shown in FIG. 11 is omitted.

In FIG. 13, the inverter boards 61 to 64 in which the primary sides of the transformers $Tr_{11}$, to $Tr_{14}$, $Tr_{21}$ to $Tr_{24}$ paired are connected to the conversion circuit parts 11 to 14, 21 to 24 are aligned and placed with the inverter boards stood up and opposed in an arrangement direction of each of the transformers $Tr_{11}$, to $Tr_{14}$, $Tr_{21}$ to $Tr_{24}$. In the case of being configured thus, even when both of the inverter boards 61 to 64 and the transformers $Tr_{11}$ to $Tr_{14}$, $Tr_{21}$ to $Tr_{24}$ are heat generation sources, the transformers $Tr_{11}$, to $Tr_{14}$, $Tr_{21}$ to $Tr_{24}$ are not present over the inverter boards 61 to 64, so that heat generation from the inverter boards 61 to 64 is not blocked by the transformers $Tr_{11}$, to $Tr_{14}$, $Tr_{21}$ to $Tr_{24}$ (see outline arrows shown in the drawing) and good heat dissipation characteristics can be ensured. Also, the inverter boards 61 to 64 are placed in an attitude stood up in an arrangement direction of the transformers $Tr_{11}$, to $Tr_{14}$, $Tr_{21}$ to $Tr_{24}$, so that effective use of installation space can be made by portrait specifications of the inverter boards 61 to 64.

Figure 14:
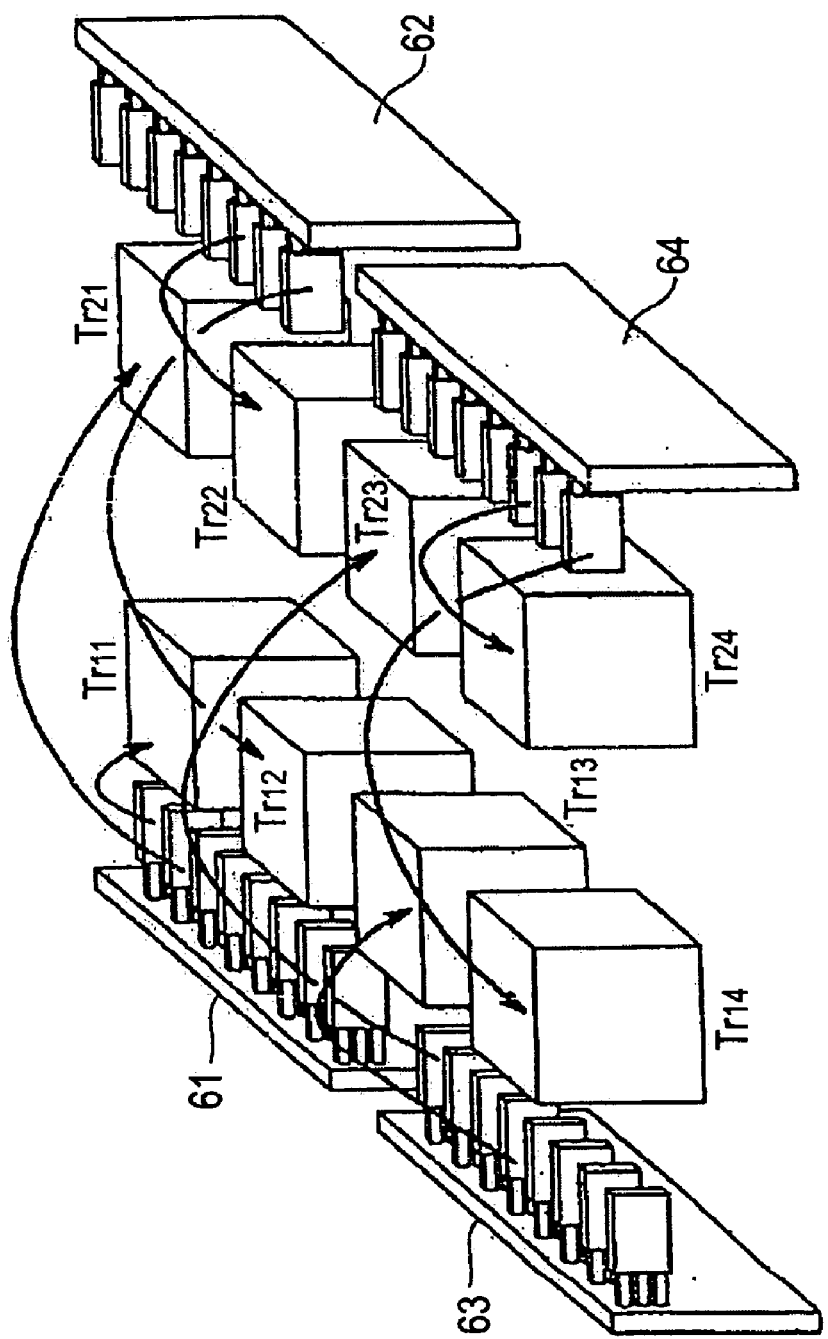
FIG. 14 is a perspective view showing the wiring state and the arrangement relation of the transformers shown in FIG. 10 and the placement relation between the inverter boards and the transformers shown in FIG. 13.

Incidentally, as shown in FIG. 14, when the inverter boards 61 to 64 are aligned and placed with the inverter boards stood up and opposed in an arrangement direction of each of the transformers $Tr_{11}$, to $Tr_{14}$, $Tr_{21}$ to $Tr_{24}$ placed in an arrangement relation of FIG. 10, improvement is obtained in terms of heat dissipation characteristics. However, as shown by solid arrows in the drawing, wiring between the inverter boards 61 to 64 and the primary sides of the transformers $Tr_{11}$, to $Tr_{14}$, $Tr_{21}$ to $Tr_{24}$ becomes longer than that of the case of FIG. 13 described above (see solid arrows shown in the drawing) and a bad influence is had on operating characteristics, so that suitable means is not provided.

Figure 15:
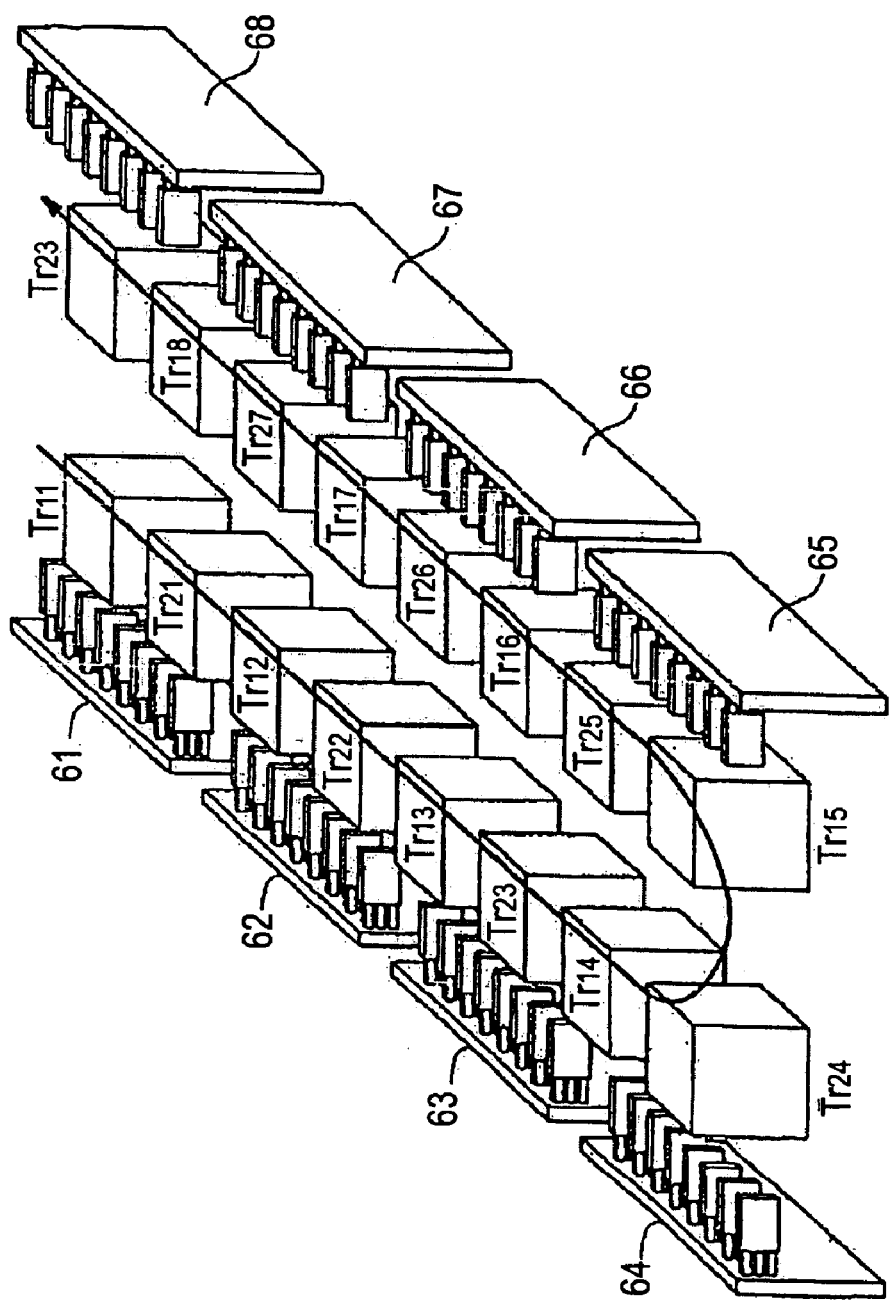
FIG. 15 is an example in which eight groups of inverter units in the embodiment of the invention are configured in a plane, and is a perspective view showing the wiring state and the arrangement relation of the transformers shown in FIG. 11 and the placement relation between the inverter boards and the transformers shown in FIG. 13.
Figure 16:
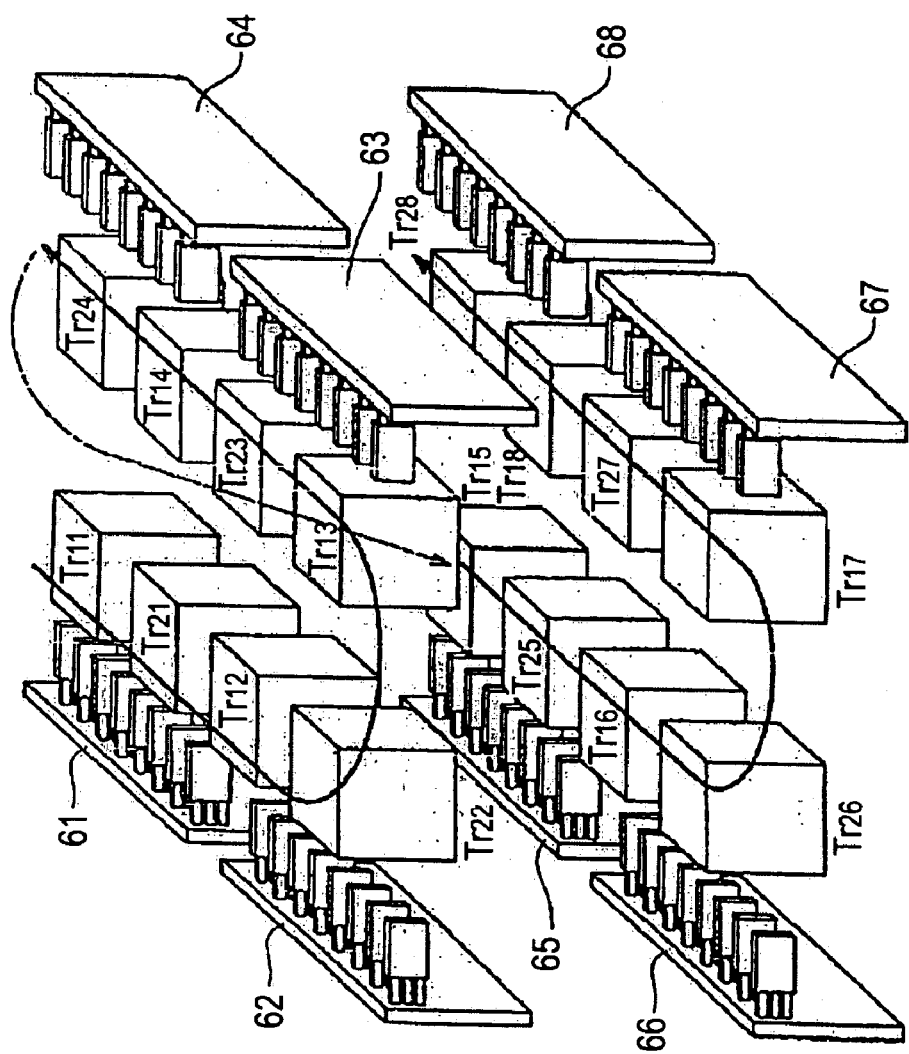
FIG. 16 is one example in which eight groups of inverter units in another embodiment of the invention are configured at multiple stages, and is a perspective view showing the wiring state and the arrangement relation of the transformers shown in FIG. 11 and the placement relation between the inverter boards and the transformers shown in FIG. 13.

When the number of groups of the inverter units $IU_1$ to $IU_n$ of the DC—DC converter increases, for example, in a DC—DC converter having eight groups of inverter units $IU_1$ to $IU_8$, inverter boards 61 to 68 could be aligned and placed with the inverter boards stood up and opposed in an arrangement direction of each of transformers $Tr_{11}$, to $Tr_{18}$, $Tr_{21}$ to $Tr_{28}$ while one transformers $Tr_{11}$, to $Tr_{18}$ and the other transformers $Tr_{21}$ to $Tr_{28}$ are placed in alternate arrangement so that an arrangement end point is fed back to an arrangement start point as shown in FIG. 15. Incidentally, illustration of wiring of the transformers $Tr_{11}$, to $Tr_{18}$, $Tr_{21}$ to $Tr_{28}$ is omitted, but the transformers $Tr_{11}$, to $Tr_{18}$, $Tr_{21}$ to $Tr_{28}$ could be connected in series by the lead wires 91, 101 of FIG. 11 as shown by solid arrows in the drawing.

Also, in the DC—DC converter of FIG. 15, the inverter boards 61 to 68 and the transformers $Tr_{11}$, to $Tr_{18}$, $Tr_{21}$ to $Tr_{28}$ have a plane configuration, but a multiple stage configuration in which transformers $Tr_{11}$, to $Tr_{18}$, $Tr_{21}$ to $Tr_{28}$ and inverter boards 61 to 68 by four groups are placed in a plane at two stages can also be used as shown in FIGS. 10 and 11. The two multiple stage configurations are different in only wiring (see broken line arrows shown in the drawing) by lead wires for making connection between the transformers located at the upper stage and the transformers located at the lower stage.

According to the embodiments of the invention as shown in FIG. 7, by adopting a structure in which n groups of inverter units comprising inverter boards for mounting a pair of conversion circuit parts and a pair of transformers are incorporated, a capacity of a DC—DC converter can become larger by implementing an n-fold increase in a conversion capacity in one inverter unit. With respect to the transformers paired in n groups of the inverter units, when the secondary sides of one transformers are wired and connected in series among n groups and also the secondary sides of the other transformers are wired and connected in series among n groups by placing one transformers and the other transformers in alternate arrangement so that an arrangement end point is fed back to an arrangement start point, wiring work can be simplified.

Also, the inverter boards in which the primary sides of the transformers paired are connected to the conversion circuit parts are aligned and placed with the inverter boards stood up and opposed in an arrangement direction of a plurality of the transformers placed in alternate arrangement so that an arrangement end point is fed back to an arrangement start point and thereby, heat generation from both of the inverter boards and the transformers is not blocked by either of them and heat dissipation characteristics can be improved.

Further, by connecting the secondary sides of one transformers of each of the inverter units in series among n groups and also connecting the secondary sides of the other transformers in series among n groups, even when there is a slight difference in output voltages of each of the conversion circuit parts, output shares of the secondary sides of one transformers and the secondary sides of the other transformers can be equalized, so that an output current of the DC—DC converter does not become an unbalance state.

What is claimed is:

1. A DC—DC converter comprising:
   n groups of inverter units provided with respect to a DC power source, the inverter unit having a pair of conversion circuit parts for converting a power source voltage of the DC power source into an AC by switching elements of a full bridge configuration and a pair of transformers A and B whose primary sides are respectively connected to outputs of each of the conversion circuit parts and whose secondary sides are respectively connected to inputs of a pair of rectification circuit parts,
   wherein the secondary sides of each transformer A in the n groups of inverter units are connected in series via a wire and also wherein the secondary sides of each transformer B in the n groups of inverter units are connected in series via a wire, and further wherein output shares of the connected transformers A are equalized with the output shares of the connected transformers B when output voltages of the conversion circuit parts, to which the transformers A and B are connected, are different.

2. A DC—DC converter as defined in claim 1, wherein the pair of the conversion circuit parts in each of the n groups of the inverter units are connected in parallel with the DC power source.

3. A DC—DC converter as defined in claim 1, wherein a pair of the conversion circuit parts in each of the n groups of the inverter units are connected in series with the DC power source.

4. A DC—DC converter as defined in claim 3, wherein the n groups of the inverter units are connected in parallel with the DC power source.

5. A DC—DC converter as defined in claim 3, wherein the n groups of the inverter units are connected in series with the DC power source.

6. A DC—DC converter as defined in claim 1, wherein the n groups of the inverter units comprises inverter boards, each for mounting the pair of conversion circuit parts.

7. A DC—DC converter as defined in claim 1, wherein the transformers A and the transformers B in the n groups of the inverter units are placed in alternate arrangement so that an arrangement end point is fed back to an arrangement start point.

8. A DC—DC converter as claimed in claim 7, wherein the inverter boards are aligned and placed in a state that the inverter boards stand up along an arrangement direction of the transformers and are opposed to the primary sides of the pair of the transformers.

9. A DC—DC converter as claimed in claim 8, wherein the transformers and the inverter boards are disposed at multiple stages in a direction perpendicular to the arrangement direction.

* * * * *